(12) United States Patent
Basho et al.

(10) Patent No.: US 8,182,559 B2
(45) Date of Patent: May 22, 2012

(54) FUEL REFORMER HOUSING CONTAINER AND FUEL REFORMING APPARATUS

(75) Inventors: Yoshihiro Basho, Kirishima (JP); Toshihiro Hashimoto, Kirishima (JP); Masaaki Miyahara, Kirishima (JP); Ryuji Mori, Kirishima (JP)

(73) Assignee: Kyocera Corporation, Kyoto (JP)

( * ) Notice: Subject to any disclaimer, the term of this patent is extended or adjusted under 35 U.S.C. 154(b) by 788 days.

(21) Appl. No.: 11/718,189

(22) PCT Filed: Oct. 27, 2005

(86) PCT No.: PCT/JP2005/019790
§ 371 (c)(1),
(2), (4) Date: Nov. 24, 2008

(87) PCT Pub. No.: WO2006/046646
PCT Pub. Date: May 4, 2006

(65) Prior Publication Data
US 2009/0229181 A1   Sep. 17, 2009

(30) Foreign Application Priority Data

| Oct. 27, 2004 | (JP) | 2004 312161 |
| Oct. 27, 2004 | (JP) | 2004-312162 |
| Dec. 22, 2004 | (JP) | 2004-371319 |
| Dec. 24, 2004 | (JP) | 2004-375035 |
| Dec. 24, 2004 | (JP) | 2004-375036 |
| Jan. 26, 2005 | (JP) | 2005-017865 |
| Jan. 28, 2005 | (JP) | 2005-021183 |

(51) Int. Cl.
*B01J 8/00* (2006.01)
(52) U.S. Cl. ......... 48/127.9; 48/128; 48/174; 48/61; 422/625; 422/602; 422/608; 422/612; 220/592.27; 220/592.2; 220/592.21; 257/433; 257/712

(58) Field of Classification Search ............ 422/612, 422/211
See application file for complete search history.

(56) References Cited

U.S. PATENT DOCUMENTS
2002/0134453 A1   9/2002   Chikuma et al.
(Continued)

FOREIGN PATENT DOCUMENTS
JP          0359599 U     6/1991
(Continued)

OTHER PUBLICATIONS

Japanese language office action and its English translation for corresponding PCT application No. PCT/JP2005/019790 lists the references above.

(Continued)

*Primary Examiner* — Kaity V. Handal
(74) *Attorney, Agent, or Firm* — DLA Piper LLP (US)

(57) ABSTRACT

There are provided a fuel reformer housing container and a fuel reforming apparatus, which are capable of maintaining a level of vacuum inside the fuel reformer housing container favorably and which have less power generation loss. A fuel reformer housing container includes a base having a concave portion for housing a fuel reformer in which reformed gas containing hydrogen gas is generated from fuel, a discharge pipe for communicating inside of the concave portion with outside thereof to discharge the reformed gas from the fuel reformer, a supply pipe for communicating inside of the concave portion with outside thereof to supply the fuel to the fuel reformer, and a gas adsorbent housed in the concave portion, for adsorbing gas in the concave portion.

12 Claims, 18 Drawing Sheets

U.S. PATENT DOCUMENTS

| | | | |
|---|---|---|---|
| 2003/0190508 A1 | 10/2003 | Takeyama et al. | |
| 2004/0043263 A1 | 3/2004 | Takeyama et al. | |
| 2004/0244290 A1 | 12/2004 | Yamamoto et al. | |
| 2005/0035447 A1* | 2/2005 | Basho et al. | 257/712 |
| 2005/0132648 A1* | 6/2005 | Miyahara et al. | 48/127.9 |
| 2005/0172554 A1* | 8/2005 | Basho et al. | 48/127.9 |
| 2008/0113233 A1* | 5/2008 | Nakamura | 429/19 |
| 2009/0068070 A1* | 3/2009 | Hashimoto et al. | 422/129 |
| 2010/0086813 A1* | 4/2010 | Yamamoto et al. | 429/19 |
| 2010/0112394 A1* | 5/2010 | Yamamoto et al. | 429/19 |
| 2011/0156190 A1* | 6/2011 | Mori | 257/433 |

FOREIGN PATENT DOCUMENTS

| | | |
|---|---|---|
| JP | 07049266 A | 2/1995 |
| JP | 10183704 A | 7/1998 |
| JP | 2001304495 A | 10/2001 |
| JP | 2002130542 A | 5/2002 |
| JP | 2002282934 A | 10/2002 |
| JP | 2003002602 A | 1/2003 |
| JP | 2004091218 A | 3/2004 |
| JP | 2004292015 A | 10/2004 |
| JP | 2004296349 A | 10/2004 |
| WO | 03040618 A2 | 5/2003 |
| WO | 2004037406 A1 | 5/2004 |

OTHER PUBLICATIONS

Extended European search report dated Oct. 28, 2010 for corresponding European application 05799233.1 lists the references above.
Japanese language office action dated Sep. 27, 2011 and its English language translation for corresponding Japanese application 2004371319 cites the foreign patent documents above.

* cited by examiner

FUEL REFORMER HOUSING CONTAINER AND FUEL REFORMING APPARATUS

TECHNICAL FIELD

The present invention relates to a fuel reformer housing container for constituting a fuel reforming apparatus using a fuel reformer that generates hydrogen gas from a variety of fuels, for example, in a fuel cell system, and also relates to a fuel reforming apparatus.

BACKGROUND ART

In recent years, a fuel cell system has been in the limelight as a next-generation power source system that produces electric energy efficiently and cleanly, and in automobile market and in market of electric power co-generation system typified by a household fuel cell power generation system, field tests for practical implementation aiming at cost reduction have been already executed energetically.

Besides, it has been examined recently to miniaturize the fuel cell system and use it as a power source of mobile equipment such as a mobile phone, a PDA (Personal Digital Assistant), a notebook computer, a digital video camera and a digital still camera.

Generally, in a fuel cell, power generation is performed in a manner that hydrocarbon gas such as methane or natural gas (CNG) or alcohol such as methanol or ethanol is used as fuel which is then reformed to hydrogen gas and other gas in a fuel reforming apparatus using a fuel reformer, and thereafter the hydrogen gas is supplied to a power generation apparatus referred to as a power generation cell.

In this case, the fuel reforming in the fuel reformer indicates a process of generating hydrogen gas by a catalytic reaction.

For example, in the case of using methanol as fuel, there are some reactions for reforming the fuel, one of which indicates, for example, a process of generating hydrogen gas ($H_2$) by a steam-reforming reaction as expressed by the following chemical reaction formula (1) (a reaction of bonding steam to methanol and thereby, reforming methanol to hydrogen and carbon dioxide in the formula (1)). Note that a minute amount of generated gas (mainly $CO_2$) other than hydrogen generated by the reforming reaction is usually discharged into the air.

$$CH_3OH + H_2O \rightarrow 3H_2 + CO_2 \quad (1)$$

Since the steam-reforming reaction as described above is an endothermic reaction, it is necessary to provide a heater or the like outside for heating the fuel reformer so that a reaction temperature is maintained. Therefore, for reforming the fuel in the fuel reformer, in order to prevent a steam-reforming activity of catalyst from lowering and keep the density of produced hydrogen gas high, a temperature of approximately 200 to 500° C. is required in the case of using methanol as fuel, and a high temperature around 300 to 800° C. is required in the case of using methane gas, for example.

Further, in a partial oxidation-reforming reaction as expressed by the following chemical reaction formula (2), for example, a reforming temperature around 400 to 600° C. is required.

$$CH_3OH + 1/2O_2 + 2N_2 \rightarrow 2H_2 + CO_2 + 2N_2 \quad (2)$$

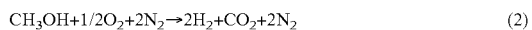

In view of the foregoing, in the cogeneration power generation system typified by the household fuel cell system, considering that the system itself is large, an outer wall of the fuel reformer housing container is formed into a double-layered structure to thus constitute a vacuum container, or, alternatively, a gap between an inner wall and an outer wall of the double-layered structure is filled up with insulation, to thereby prevent heat inside the fuel reformer from being conducted to outside so that the temperature of the fuel reformer will not decrease. Accordingly, upon housing the fuel reformer into the fuel reformer housing container, it is possible to join the fuel reformer directly to the inner wall of the double-layered structure of the fuel reformer housing container so that the fuel reformer can be placed and fixed in the fuel reformer housing container.

As a related art, there is Japanese Unexamined Patent Publication JP-A 2003-2602.

In recent years, a fuel cell system for use in a mobile equipment has been demanded to be smaller in size and lower in height in order to be housed in the mobile equipment. However, the conventional outer wall of the fuel reformer housing container formed into the double-layered structure is not adoptable in the fuel cell system for use in the mobile equipment because the fuel cell system becomes complicated and larger in size overall. For the fuel cell system for use in the mobile equipment, there has been thus proposed a fuel cell system with a fuel reformer housing container composed of a base having a concave portion and a lid body, of which inner part is formed in a vacuum state to cut off the outward conduction of heat generated in reforming the fuel inside the fuel reformer, resulting in small power generation loss.

In order to use the fuel cell system as described above stably and safely for a long period of time, the vacuum state inside the fuel reformer housing container needs to be maintained not only for a short period just after sealing the fuel reformer housing container in which the fuel reformer is housed, but also for a long period thereafter. However, after sealing the fuel reformer housing container by the lid body, the gas adsorbed to an inner surface of the fuel reformer housing container and surfaces of various components inside the fuel reformer housing container such as a surface of the fuel reformer itself may possibly be released as outgas inside the fuel reformer housing container by influences of a temperature in reforming the fuel and as time passes.

In this case, the level of vacuum inside the fuel reformer housing container drops, thus leading an increase in an amount of outward conduction of heat generated in reforming the fuel inside the fuel reformer, with the result that a temperature of the fuel reformer housing container rises by the heat, which may break other components inside the mobile equipment.

Further, in the case where the fuel-reforming reaction is an endothermic reaction such as the steam-reforming reaction as expressed by the chemical reaction formula (1), the fuel reforming in the fuel reformer requires a heater or the like for heating the fuel reformer so that a reaction temperature is maintained at a constant level, but the heat generated in the fuel reformer is conducted to the fuel reformer housing container as described above, thus causing the temperature of the fuel reformer to be more easily decreased.

In view of the foregoing, the amount of power generation of the heater needs to be increased in order to maintain the reaction temperature, but the increase in the power generation of the heater leads an increase in electric capacity which is used for heating the heater, relative to the total electric capacity generated in the power generation cell of the fuel cell, resulting in a problem that the power generation loss in the entire fuel cell system increases.

DISCLOSURE OF INVENTION

The invention has been completed in consideration of the above-stated problems in the related art, and an object of the invention is to provide a fuel reformer housing container and a fuel reformer which are capable of maintaining a level of vacuum inside the fuel reformer housing container favorably and which have less power generation loss.

The invention provides a fuel reformer housing container comprising:

a base having a concave portion for housing a fuel reformer in which reformed gas containing hydrogen gas is generated from fuel;

a discharge pipe for communicating inside of the concave portion with outside thereof to discharge the reformed gas from the fuel reformer;

a supply pipe for communicating inside of the concave portion with outside thereof to supply the fuel to the fuel reformer;

a lid body joined to the base so as to cover the concave portion of the base; and a gas adsorbent housed in the concave portion, for adsorbing gas in the concave portion.

In the invention, it is preferable that the gas adsorbent is disposed between the fuel reformer and an inner surface defining the concave portion or between the fuel reformer and the lid body so that the gas adsorbent is adjacent to or in contact with the fuel reformer.

In the invention, it is preferable that a distance between the gas adsorbent and the discharge pipe is set to be shorter than a distance between the gas adsorbent and the supply pipe.

In the invention, it is preferable that the fuel reformer housing container further comprises a lead terminal which is attached onto the base so as to be led from inside of the concave portion to outside, and the gas adsorbent is fixed on the lead terminal inside the concave portion while securing a distance from the base.

In the invention, it is preferable that the gas adsorbent is formed by depositing metal powder on a surface of a metal plate, a lead terminal serving for energization of the gas adsorbent is provided so as to communicate the inside of the concave portion with outside thereof, and a part of energized portion of the metal plate is provided with a high-resistance portion of which sectional area cut in a direction orthogonal to an energizing direction is smaller than sectional areas of other parts.

In the invention, it is preferable that the high-resistance portion is formed by providing a notch in the energized portion of the metal plate.

In the invention, it is preferable that the gas adsorbent is disposed so as to face the fuel reformer, and the notch is provided so as to face the fuel reformer.

In the invention, it is preferable that a groove for discharging gas inside the concave portion is formed on at least one of a joint of the base to the lid body and a joint of the lid body to the base.

In the invention, it is preferable that at least one of the joint of the base to the lid body and the joint of the lid body to the base is formed so as to protrude all around, and the groove is formed by notching a part of the protruded portion.

In the invention, it is preferable that the gas adsorbent is disposed along an inner surface defining the concave portion near the groove.

In the invention, it is preferable that the lid body and the base are made of a metal material of which thermal conductivity is 120 W/mK or less.

The invention provides a fuel reforming apparatus comprising the above-described fuel reformer housing container and a fuel reformer housed in the concave portion.

In the invention, it is preferable that the gas adsorbent is provided on a surface of the fuel reformer.

In the invention, it is preferable that the gas adsorbent and the fuel reformer are joined to each other via a metal plate.

In the invention, it is preferable that the gas adsorbent is disposed on a heat-generating portion of the fuel reformer.

In the invention, it is preferable that an inner pressure of the concave portion is $10^2$ Pa or less.

In the invention, it is preferable that the lid body and the base are joined to each other by any one of a projection method, a seam welding method, an electronic beam method, and a laser beam method.

BRIEF DESCRIPTION OF DRAWINGS

Objects, features, and advantages of the invention will be more explicit from the following detailed description taken with reference to the drawing wherein.

BEST MODE FOR CARRYING OUT THE INVENTION

Figure 1:
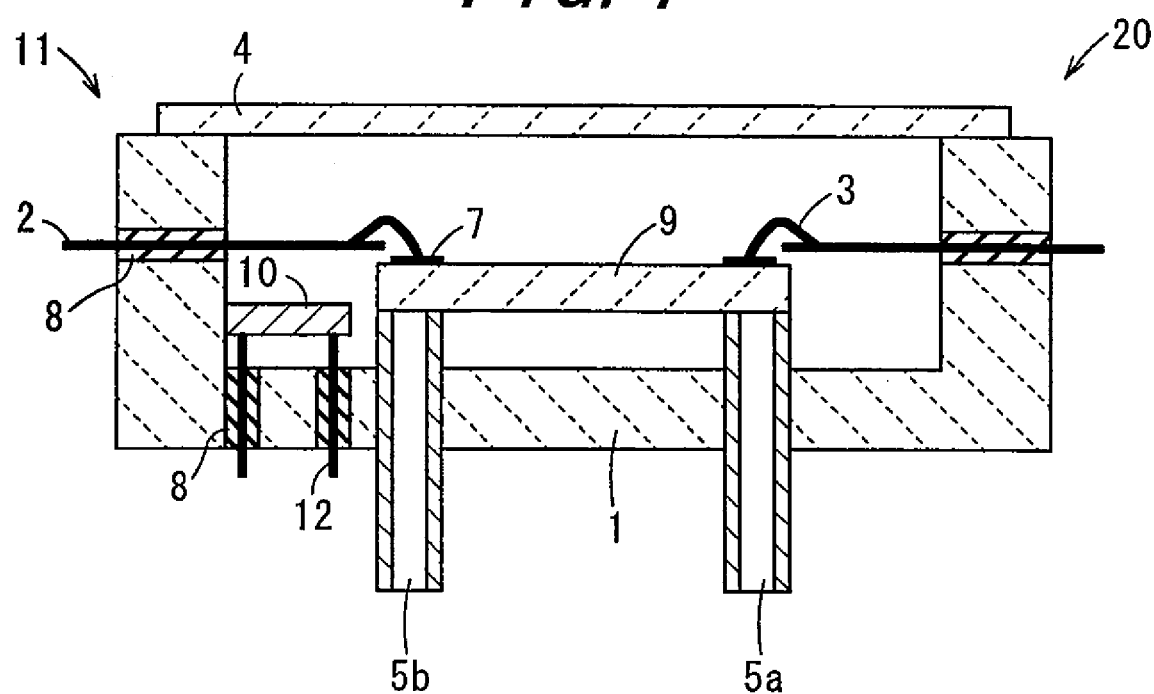
FIG. 1 is a sectional view showing a fuel reforming apparatus according to a first embodiment of the invention.

Now referring to the drawings, preferred embodiments of the invention are described below.

FIG. 1 is a sectional view showing a fuel reforming apparatus 20 according to a first embodiment of the invention. The fuel reforming apparatus 20 includes a base 1, an external lead terminal 2 serving as a wiring for supplying electric power to a fuel reformer, a lid body 4, a supply pipe 5a serving as a supplying passage for supplying fuel, a discharge pipe 5b serving as a discharging passage for discharging reformed gas, an insulating sealing material 8, a fuel reformer 9, a gas adsorbent 10, and a lead terminal 12 on which the gas adsorbent 10 is fixed. The insulating sealing material 8 seals through-holes of the base 1, in which the external lead terminal 2 and the lead terminal 12 are fixed and insulated. A fuel reformer housing container 11 is configured so as to house the fuel reformer 9 by using the base 1, the lid body 4, the supply pipe 5a, and the discharge pipe 5b. In the fuel reformer housing container 11, the fuel reformer 9 and the gas adsorbent 10 are housed, and a concave portion of the base 1 is hermetically sealed with the lid body 4, thus resulting in the fuel reforming apparatus 20.

Both of the base 1 and the lid body 4 of the invention have a role as a container that houses the fuel reformer 9. The base 1 and the lid body 4 are made of, for example, metal materials such as Fe-based alloy including stainless steel, Fe—Ni—Co alloy, and Fe—Ni alloy, or oxygen free copper; aluminum oxide ($Al_2O_3$) sintered body; mullite ($3Al_2O_3.2SiO_2$) sintered body; silicon carbide (SiC) sintered body; aluminum nitride (AlN) sintered body; or silicon nitride ($Si_3N_4$) sintered body; a ceramic material including glass ceramic; and a highly heat-resistant resin material including polyimide.

Note that the glass ceramic applicable to the base 1 and the lid body 4 is formed of a glass component and a filler component. Examples of the glass component include $SiO_2$—$B_2O_3$, $SiO_2$—$B_2O_3$—$Al_2O_3$, $SiO_2$—$B_2O_3$—$Al_2O_3$-MO (M represents Ca, Sr, Mg, Ba or Zn), $SiO_2$—$Al_2O_3$-$M^1O$-$M^2O$ ($M^1$ and $M^2$ are the same or different, and represent Ca, Sr, Mg, Ba or Zn), $SiO_2$—$B_2O_3$—$Al_2O_3$-$M^1O$-$M^2O$ ($M^1$ and $M^2$ are as described above), $SiO_2$—$B_2O_3$-$M^3_2O$ ($M^3$ represents Li, Na or K), $SiO_2$—$B_2O_3$—$Al_2O_3$-$M^3_2O$ ($M^3$ is as described above), Pb glass, and Bi glass.

Further, examples of the filler component include a composite oxide of $Al_2O_3$, $SiO_2$, $ZrO_2$ and an alkaline earth metal oxide, a composite oxide of $TiO_2$ and an alkaline earth metal oxide, and a composite oxide (for example, spinel, mullite, and cordierite) containing at least one selected from the group consisting of $Al_2O_3$ and $SiO_2$.

To take an example, the base 1 and the lid body 4 are made of a compact aluminum oxide sintered body whose relative density is 95% or more. In this case, the base 1 and the lid body 4 are fabricated as follows. For example, to begin with, a sintering aid such as rare-earth oxide powder and aluminum oxide powder is added to aluminum oxide powder which is then mixed so that powder of raw material of the aluminum oxide sintered body is prepared. Next, an organic binder and a dispersion medium are added to the powder of raw material which is then mixed into paste to be processed by a doctor blade method. Alternatively, an organic binder is added to the powder of raw material which is then processed by press molding, rolling molding or the like method so that a green sheet having a predetermined thickness is produced. Then, a predetermined number of sheet-shaped products are aligned, laminated and bonded by pressure, and a thus-obtained laminated product is thereafter fired, for example, at a firing maximum temperature of 1200 to 1500° C. in a non-oxidative atmosphere. In this way, the base 1 and the lid body 4 made of ceramic are obtained as aimed. The base 1 and the lid body 4 may be formed by a powder mold pressing method.

To take another example, in a case where the base 1 and the lid body 4 are made of metal materials, a cutting method, a pressing method, an MIM (Metal Injection Mold) method, or the like method is used to form a predetermined shape.

Further, in the case where the base 1 and the lid body 4 are made of metal materials, it is desirable to apply to the surfaces of the base 1 and the lid body 4, for example, a plating treatment with Au or Ni, or a coating treatment such as resin coating which uses polyimide and the like resin, in order to prevent corrosion. For example, in the case of Au plating treatment, it is desired that its thickness be approximately 0.1 to 5 μm.

In order to make the fuel reformer housing container 11 be smaller in size and lower in height, the base 1 and the lid body 4 as described above should be formed thin, of which mechanical strength, i.e. a bending strength is preferably 200 MPa or more.

Next, it is preferred that the external lead terminal 2 and the lead terminal 12 be made of metals whose thermal expansion coefficients are equal or approximate to those of the base 1 and lid body 4. For example, the external lead terminal 2 made of Fe—Ni alloy and the lead terminal 12 made of Fe—Ni—Co alloy can prevent thermal strain caused in response to a temperature change in practical implementation. Besides, favorable sealing adhesions can be obtained between the external lead terminal 2 and the base 1 and between the lead terminal 12 and the base 1, and it is moreover possible to secure an excellent bonding property, a strength necessary for implementation, and favorable soldering property and welding property.

Further, the insulating sealing material 8 is made of, for example, a glass material such as borosilicate glass, alkali glass, and insulation glass whose chief constituent is lead, and a ceramic material such as aluminum oxide. In through-holes formed in the base 1, the insulating sealing material 8 achieves the electrical insulation between the base 1 and the external lead terminal 2 and between the base 1 and the lead terminal 12 while the external lead terminal 2 and the lead terminal 12 are sealed and fixed. The through-holes formed in the base 1, through which the external lead terminal 2 and the lead terminal 12 are inserted, each need to have such a size as to prevent mutual contact which causes the electric conduction between the base 1 and the external lead terminal 2 and between the base 1 and the lead terminal 12. To be specific, the through-hole needs to have such an inner diameter to secure a gap of 0.1 mm or more from the external lead terminal 2 or lead terminal 12 to the base 1.

Note that, in a case where the insulating sealing material 8 is made of a ceramics material such as aluminum oxide, the external lead terminal 2 and the lead terminal 12 are inserted into the through-holes of the base 1 with a cylindrical insulating sealing material 8 made of the ceramic material interposed between the external lead terminal 2 and lead terminal 12 and the base 1. In this case, it is possible to use a brazing material such as Au—Ge and Ag—Cu for connecting the insulating sealing material 8 to the base 1, connecting the insulating sealing material 8 to the external lead terminal 2, and connecting the insulating sealing material 8 to the lead terminal 12.

The electrode 7 on the fuel reformer 9 and the external lead terminal 2 are electrically connected to each other via the bonding wire 3. Furthermore, the concave portion of the base 1 is sealed by the use of the lid body 4, thereby forming a fuel reforming apparatus that hermetically seals the fuel reformer 9 housed in the concave portion of the fuel reformer housing container 11.

The fuel reformer 9 housed in the fuel reformer housing container 11 according to the invention is a device for reforming fuel, having therein a fine flow channel or air gap which carries a catalyst for reforming fuel.

The fuel reformer 9 is various in shape and may have, for example, a substantially square shape which is used as a minute chemical device, for example, having a liquid fluid channel fabricated by using a semiconductor production technique to form a thin groove in a base material, for example, made of an inorganic material such as semiconductor like silicon, silica, glass, metal, and ceramic by means of a cutting method, an etching method, a blast method, or the like method, and a glass plate or a cover made of metal etc. is then closely attached to the surface by anodic bonding, brazing, welding, or the like method for the purpose of prevention of evaporation of a fluid in operation. Further, the fuel reformer 9 may have a tubular shape formed of an inorganic material such as silica, glass, metal, and ceramic, which carries a catalyst therein for reforming fuel.

In a case where a fuel-reforming reaction is an endothermic reaction such as a steam-reforming reaction, inside the fuel reformer 9 is formed a temperature adjusting mechanism such as a thin film heater (not shown) or a thick film heater (not shown) composed of a resistance layer or the like component, and on a surface of the fuel reformer 9 is formed the electrode 7 as a terminal that supplies electric power to the heater. With the temperature adjusting mechanism, the temperature of the fuel reformer 9 is adjusted to approximately 200 to 800° C. of which temperature condition corresponds to a fuel reforming condition, so that the fuel supplied from a fuel supply port to which the supply pipe 5a is connected is brought to react with steam, thus allowing favorable acceleration in the reforming action for generating hydrogen gas from the discharge pipe 5b connected to a fuel discharge port.

The heater as described above is disposed inside or near the flow channel or air gap in the fuel reformer 9, which carries a catalyst to perform the fuel reforming. The heat being generated from the heater can be thus used efficiently for the fuel-reforming reaction.

The fuel reformer 9 is housed in the fuel reformer housing container 11 in a manner that the lid body 4 is attached to the base 1 so as to cover the concave portion of the base 1 by joining them using a metallic brazing material such as Au alloy, Ag alloy, and Al alloy or a glass material, or by a seam welding method, etc.

For example, in the case of using an Au—Sn brazing material for the joining, the Au—Sn brazing material is welded to the lid body 4 in advance, or alternatively, the Au—Sn brazing material formed into a frame-shape by a punching processing or the like method using a die etc. is placed between the base 1 and the lid body 4, and thereafter, the lid body 4 is joined to the base 1 in a sealing furnace or a seam welder, with the result that the fuel reformer 9 can be sealed in the fuel reformer housing container 11.

Further, the fuel reformer 9 is formed so that the electrode 7 on the fuel reformer 9 is electrically connected to the external lead terminal 2 disposed on the base 1 via the bonding wire 3. Consequently, the heater formed on the surface of or inside the fuel reformer 9 can be heated through the electrode 7. As a result, the reaction temperature can be maintained in the fuel reformer 9, thus allowing the fuel-reforming reaction to be stabilized.

The supply pipe 5a and the discharge pipe 5b are respectively a supplying passage for a raw material or a fuel gas fluid and a discharging passage for reformed gas containing hydrogen. The supply pipe 5a and the discharge pipe 5b are each made of, for example, a metal material such as Fe—Ni alloy, Fe—Ni—Co alloy, and stainless steel, a ceramic material such as $Al_2O_3$ sintered body, $3Al_2O_3 \cdot 2SiO_2$ sintered body, SiC sintered body, AlN sintered body, $Si_3N_4$ sintered body and glass ceramic sintered body, a resin material having high heat resistance such as polyimide, or glass.

It is preferred that the supply pipe 5a and the discharge pipe 5b be each made of a material which is hard to be embrittled by hydrogen contained in reformed gas. Such a material includes Fe alloy, ceramic, and glass.

In the fuel reformer housing container of the invention, the gas adsorbent 10 for adsorbing gas in the concave portion is preferably housed in the concave portion. Consequently, even when the gas adsorbed to the inner surface of the fuel reformer housing container or the surfaces of various components inside the fuel reformer housing container such as the surface of the fuel reformer 9 itself is released, after sealed by the lid body 4, as outgas inside the fuel reformer housing container 11 by influences of a temperature in reforming the fuel and as time passes, the gas can be favorably adsorbed by the gas adsorbent 10 and therefore, it is possible to maintain the vacuum state inside the fuel reformer housing container 11 not only for a short period just after sealing the fuel reformer housing container 11 in which the fuel reformer 9 is housed, but also for a long period thereafter.

The gas adsorbent 10 carries out evacuation by using gas adsorption effected by chemically-active metal powder. The gas adsorbent 10 is fabricated by making one surface or both surfaces of the metal plate formed of Ni—Cr or the like ingredient having a thickness of around 10 to 500 μm carry metal powder containing Zr, Fe, V, or the like component as chief constituents, which metal powder will have a thickness of 10 μm to 1 mm.

Note that the surface of the metal powder of the gas adsorbent 10 is usually covered with an oxide film and therefore, such a surface remaining intact as it is exerts no gas adsorption. The metal powder of the gas adsorbent 10 is thus subjected to a heating process so that the oxide film on the surface of the adsorbent spreads into the adsorbent to then cause a new active surface to appear, thus initiating (activating) the gas adsorption.

Accordingly, the gas adsorbent 10 is attached to the lead terminal 12 by a spot welding method or the like method at a position distanced away from the base 1 and the lid body 4 and thus fixed inside the fuel reformer housing container 11. That is to say, the gas adsorbent 10 is in a state of being suspended from the base 1 and the lid body 4 so that the heat of the gas adsorbent 10 can be effectively prevented from being conducted to the base 1 and the lid body 4.

In order to provide the fuel reformer housing container 11 with the heat insulating property, it is necessary to form a vacuum inside the fuel reformer housing container 11. Upon sealing the fuel reformer 9, it is appropriate to carry out the sealing by using the brazing material in a vacuum furnace, or by the seam welding method in a vacuum chamber.

Subsequently, the gas adsorbent 10 is energized through the lead terminal 12 so that the metal plate of the gas adsorbent 10 is heated to thereby have the metal powder of the gas adsorbent 10 activated.

The activation condition for the gas adsorbent 10 is varied depending on a sort of metal powder. The activated state can be obtained by heating the gas adsorbent 10 at a temperature of around 350 to 900° C.

Further, it is desired especially that the gas adsorbent 10 be disposed near the temperature adjusting mechanism formed in the fuel reformer 9, e.g. a heater portion composed of a resistive layer and the like, so that the gas adsorbent 10 is more easily activated by absorbing the radiant heat emitted from the fuel reformer 9.

Furthermore, in order to reduce the heat transmission from the fuel reformer 9 to the base 1 and the lid body 4, it is preferred that the gas adsorbent 10 be disposed adjacent to or in contact with the fuel reformer 9 between the fuel reformer 9 and the inner surface defining the concave portion or between the fuel reformer 9 and the lid body 4. This allows the gas adsorbent 10 to keep activated by the heat emitted from the fuel reformer 9 to thus remain high in gas adsorbing ability, and at the same time, the temperature of the surface of the fuel reformer housing container 11 can be more effectively prevented from rising.

Herein, the layout of the gas adsorbent 10 being disposed adjacent to the fuel reformer 9 means that a distance between the gas adsorbent 10 and the fuel reformer 9 is shorter than a distance between the gas adsorbent 10 and the inner surface defining the base 1, or that a distance between gas adsorbent 10 and the fuel reformer 9 is shorter than a distance between the gas adsorbent 10 and a principal surface of the lid body 4 facing the base 1. More preferably, the gas adsorbent 10 is in contact with the fuel reformer 9, or a distance between the gas adsorbent 10 and the fuel reformer 9 is 5 mm or less. This allows the heat emitted from the fuel reformer 9 to effectively contribute to rise of the temperature of the gas adsorbent 10.

As a layout example of the gas adsorbent 10, in a case where the fuel reformer 9 has a substantially square shape, it is desired that the gas adsorbent 10 be disposed so as to face a principal surface of the fuel reformer 9. This allows the gas adsorbent 10 to effectively cut off conduction of the heat which is emitted from the principal surface of fuel reformer 9 adapted to release a larger amount of heat and which is directed to the base 1 and the lid body 4, and moreover it is also possible to favorably rise the temperature of the gas adsorbent 10.

Further, in a case where the fuel reformer 9 has a tubular shape which is bent on one plane, it is desired that the gas adsorbent 10 be disposed so as to face the one plane in parallel therewith. This allows the gas adsorbent 10 to face many parts of the fuel reformer 9 so that the heat which is conducted to the base 1 and the lid body 4 can be effectively cut off at the gas adsorbent 10, and moreover it is also possible to favorably rise the temperature of the gas adsorbent 10.

Further, it is preferred that in the fuel reformer housing container 11 of the invention, a distance between the gas adsorbent 10 and the discharge pipe 5b be set to be shorter than a distance between the gas adsorbent 10 and the supply pipe 5a. Accordingly, the reformed gas has a high temperature shortly after reformed by the fuel reformer 9, and the heat of the discharge pipe 5b which has a high temperature attributable to such high-temperature gas can be utilized for the activation of the gas adsorbent 10, with the result that the electric power for heating the gas adsorbent 10 can be reduced, and moreover, the vacuum state inside the power generation loss fuel reformer housing container 11 can be favorably maintained.

Note that although the lead terminal 12 which fixes the gas adsorbent 10 is inserted and thus attached to the base 1 in an example shown in FIG. 1, the lead terminal 12 may be inserted and thus attached to the lid body 4.

Figure 2:
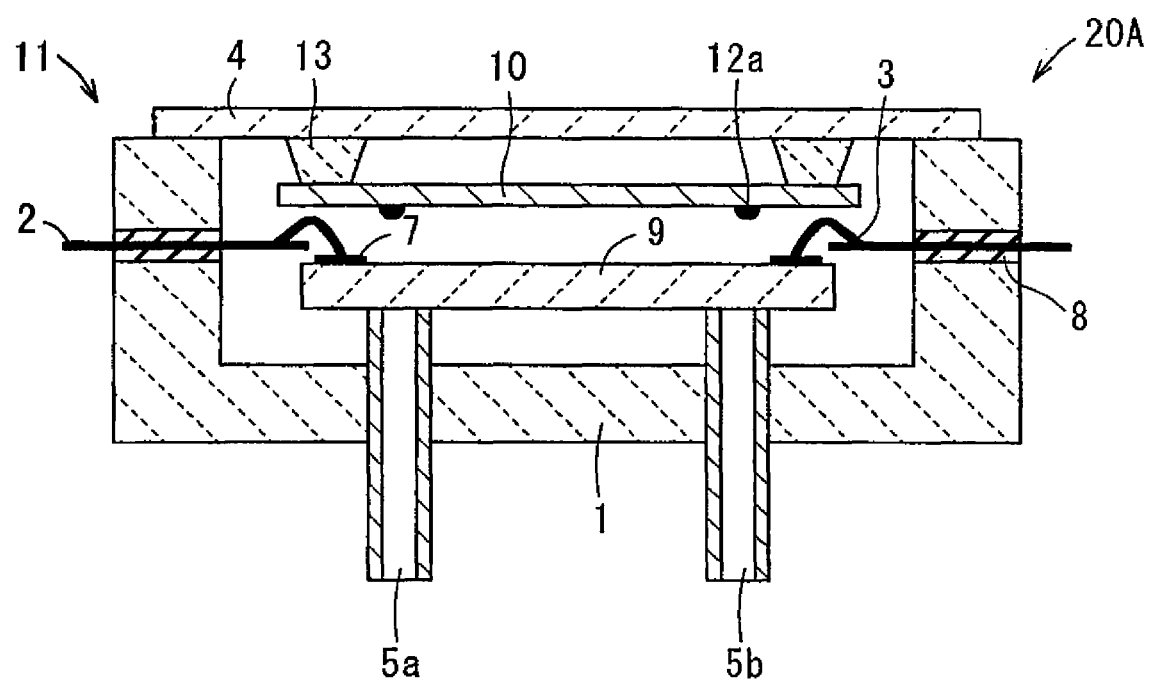
FIG. 2 is a sectional view showing a fuel reforming apparatus according to a second embodiment of the invention.

FIG. 2 is a sectional view showing a fuel reforming apparatus 20A according to a second embodiment of the invention. In the present embodiment, parts corresponding to configuration according to the above-described embodiment will be denoted by the same reference numerals so that descriptions thereof will be omitted.

The fuel reforming apparatus 20A includes a base, an external lead terminal 2, a lid body 4, a supply pipe 5a, a discharge pipe 5b, an insulating sealing material 8, a fuel reformer 9 having an electrode 7, a gas adsorbent 10, and a lead terminal 12a. A fuel reformer housing container 11 is configured so as to house the fuel reformer 9 by using the base 1, the lid body 4, the supply pipe 5a, and the discharge pipe 5b. In the fuel reformer housing container 11, the fuel reformer 9 and the gas adsorbent 10 are housed, and a concave portion of the base 1 is hermetically sealed with the lid body 4, thus resulting in the fuel reforming apparatus 20A. The lead terminal 12a is configured in the same manner as the lead terminal 12 according to the above-described embodiment, except that the lead terminal 12a is provided in a through-hole formed in a side wall which is different from a side wall having the penetrating external lead terminal 2, among four side walls having inner surfaces defining the concave portion of the base 1.

In the embodiment, the gas adsorbent 10 is placed and fixed directly on the inner surface defining the concave portion of the base 1, the principal surface of the lid body 4 facing the base 1, or the surface of the fuel reformer 9. Further, as shown in FIG. 2, the gas adsorbent 10 may be placed and fixed on the inner surface defining the concave portion of the base 1, the principal surface of the lid body 4 facing the base 1, or the surface of the fuel reformer 9 by way of a pedestal 13 formed of ceramic, metal, or resin. Moreover, the gas adsorbent 10 may be fixed only on the lead terminal 12 and disposed so as to be distanced away from the base 1, the lid body 4, or the fuel reformer 9.

The gas adsorbent 10 carries out evacuation by using gas adsorption effected by chemically-active metal powder. The gas adsorbent 10 is fabricated by making one surface or both surfaces of the metal plate formed of Ni—Cr or the like ingredient having a thickness of around 10 to 500 μm carry metal powder containing Zr, Fe, V, or the like component as chief constituents, which metal powder will have a thickness of 10 μm to 1 mm. The profile is preferably set to have the same size as that of the fuel reformer 9 so that the gas adsorbent 10 can absorb the radiant heat emitted from the fuel reformer 9. Moreover, the lead terminal 12a is attached to the gas adsorbent 10 by the spot welding or the like method.

In order to provide the fuel reformer housing container 11 with the heat insulating property, it is necessary to form a vacuum inside the fuel reformer housing container 11. Upon sealing the fuel reformer 9, it is appropriate to carry out the sealing by using the brazing material in a vacuum furnace, or by the seam welding method in a vacuum chamber.

Subsequently, the gas adsorbent 10 is energized through the lead terminal 12a and thereby heated to be activated. As the activation condition, the gas adsorbent is heated at a temperature of 350 to 900° C., thus resulting in a nearly 100%-activated state.

The activation means that in a production process, the removal of the oxide film formed on the surface of the gas adsorbent 10 causes a new gas-adsorbing surface to appear so that the gas adsorbent 10 is given a function of adsorbing gas such as CO, $N_2$, and $H_2$ existing in its surrounding area. The temperature and time for the activation are varied depending on a sort of metal powder in use.

It is preferred that the gas adsorbent 10 be disposed so as to face a high-temperature portion of the fuel reformer 9 so that the gas adsorbent 10 is more easily activated by absorbing the radiant heat emitted from the fuel reformer 9. It is desired especially that the gas adsorbent 10 be disposed near the temperature adjusting mechanism formed in the fuel reformer 9, e.g. a heater portion composed of a resistive layer and the like.

Note that although the gas adsorbent 10 is placed on the principal surface of the lid body 4 facing the base 1, the gas adsorbent 10 may be placed on the inner surface defining the concave portion of the base 1 or the surface of the fuel reformer 9. Furthermore, the adsorbent 10 may be placed in a gap between the fuel reformer 9 and a bottom plate of the concave portion of the base 1, or in a gap between the fuel reformer 9 and a side surface of the concave portion of the base 1.

Figure 3:
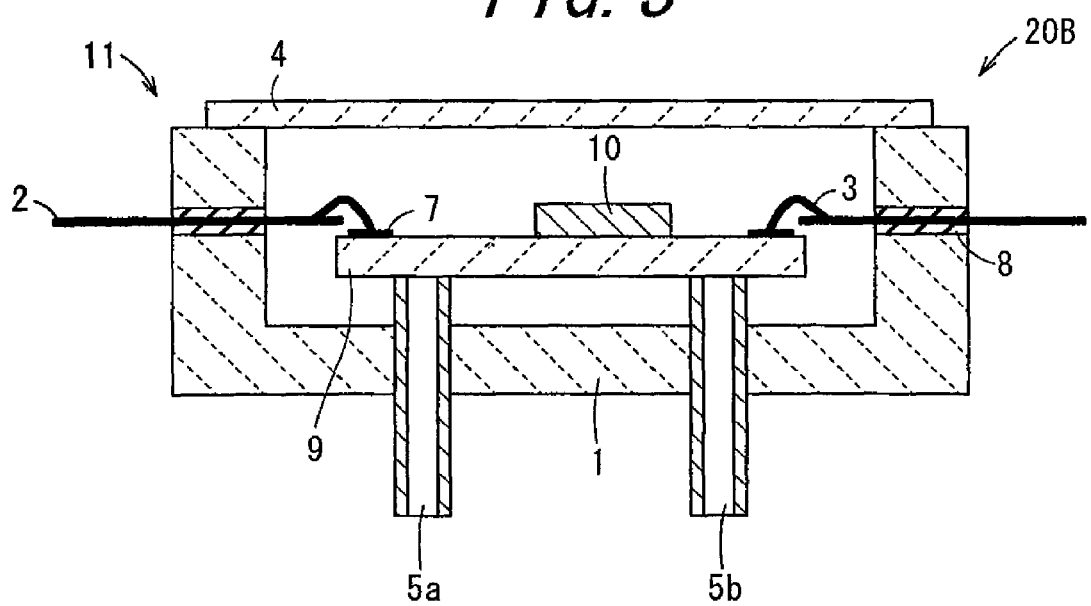
FIG. 3 is a sectional view showing a fuel reforming apparatus according to a third embodiment of the invention.

FIG. 3 is a sectional view showing a fuel reforming apparatus 20B according to a third embodiment of the invention. In the present embodiment, parts corresponding to configurations according to the above-described embodiments will be denoted by the same reference numerals so that descriptions thereof will be omitted.

The fuel reforming apparatus 20B includes a base 1, an external lead terminal 2, a lid body 4, a supply pipe 5a, a discharge pipe 5b, an insulating sealing material 8, a fuel reformer 9 having an electrode 7, and a gas adsorbent 10. A fuel reformer housing container 11 is configured so as to house the fuel reformer 9 by using the base 1, the lid body 4, the supply pipe 5a, and the discharge pipe 5b. In the fuel reformer housing container 11, the fuel reformer 9 and the gas adsorbent 10 are housed, and a concave portion of the base 1 is hermetically sealed with the lid body 4, thus resulting in the fuel reforming apparatus 20B. In the present embodiment, it is notable that the adsorbent 10 is provided on the surface of the fuel reformer 9.

The gas adsorbent 10 is formed of chemically-active metal powder containing Zr, Fe, V, or the like component as chief constituents, and carries out evacuation by using the gas adsorption, and is provided on the surface of the fuel reformer 9. As described above, providing the gas adsorbent 10 on the fuel reformer 9 leads the reduction in transmission of the radiant heat from the fuel reformer 9 to the base 1 and the lid body 4, thus allowing the gas adsorbent 10 to keep activated by the heat emitted from the fuel reformer 9 to thus remain further high in gas adsorbing ability, and at the same time, the temperature of the surface of the fuel reformer housing container 11 can be more effectively prevented from rising.

Further, the electrode 7 on the fuel reformer 9 and the external lead terminal 2 are electrically connected to each other via the bonding wire 3, or alternatively, the electrode 7 and the external lead terminal 2 are electrically connected to each other directly. Furthermore, the concave portion of the base 1 is sealed by the use of the lid body 4, thereby forming the fuel reforming apparatus 20B that hermetically seals the fuel reformer 9 housed in the concave portion of the base 1.

The fuel reformer 9 is housed in the fuel reformer housing container 11 in a manner that the lid body 4 is attached to the base 1 so as to cover the concave portion of the base 1 by joining them using a metallic brazing material such as Au alloy, Ag alloy, and Al alloy or a glass material, or by resistance welding, etc.

In order to provide the fuel reformer housing container 11 with the heat insulating property, it is necessary to form a vacuum inside the fuel reformer housing container 11. In order to make the vacuum state, upon sealing the fuel reformer 9, it is appropriate to carry out the sealing by using the brazing material in a vacuum furnace or by the seam welding method, the electronic beam method, the projection method, etc. in a vacuum chamber, or alternatively, it is appropriate to carry out the sealing in advance by the seam welding method, the projection method, etc. in an inert atmosphere, and then perform vacuuming from a vacuuming pipe (not shown) formed in the fuel reformer housing container 11, followed by squashing the vacuuming pipe and then bonding under pressure, thus resulting in formation of the vacuum inside the fuel reformer housing container 11.

Subsequently, the fuel reforming apparatus 11 is heated over all in order to activate the gas adsorbent 10, or alternatively, the gas adsorbent 10 is heated by the heat of the fuel reformer 9. As the activation condition, the gas adsorbent is heated at a temperature of 350 to 900° C., thus resulting in a nearly 100%-activated state.

Further, the gas adsorbent 10 is provided on the surface of the fuel reformer 9 as described above, but it is preferable that the gas adsorbent 10 be joined to the fuel reformer 9 via a metal plate or metal layer formed of Ni—Cr or the like ingredient. This is because the interposition of the metal plate or metal layer leads to reinforcement of the bonding strength between the gas adsorbent 10 and the fuel reformer 9, and gives the metal plate or metal layer the heat released from the fuel reformer 9, which heat can be used to activate the gas adsorbent 10 evenly, so that the electric power for heating the gas adsorbent 10 can be reduced and the efficiency of power generation of the fuel cell system can be enhanced. Moreover, it is also possible to activate the gas adsorbent 10 by forming a high-resistive metal plate or metal layer of Ni—Cr or the like and applying the electric current to the metal plate or metal layer so that the metal plate or metal layer generates heat.

It is further preferred that the gas adsorbent 10 be fabricated by making one surface or both surfaces of the metal plate having a thickness of around 10 to 500 μm carry the metal powder which will have a thickness of 10 μm to 1 mm. And the metal plate is preferably selected to have the same size as that of the fuel reformer 9 so that the metal plate can adsorb the radiant heat emitted from the fuel reformer 9. Moreover, the gas adsorbent 10 is mounted by the spot welding or the like method.

Further, it is more preferred that the gas adsorbent 10 be disposed so as to face the high-temperature portion of the fuel reformer 9 so that the gas adsorbent 10 is more easily activated by absorbing the radiant heat emitted from the fuel reformer 9.

Further, it is desired that the gas adsorbent 10 be disposed on a heat-generating portion of the fuel reformer 9. This allows the gas adsorbent 10 to more effectively cut off conduction of the heat which is emitted from the heat-generating portion such as a thin film heater and a thick film heater formed in the fuel reformer 9 adapted to release a larger amount of heat and which is directed to the base 1 and the lid body 4, and moreover it is also possible to favorably rise the temperature of the gas adsorbent 10.

Note that although the gas adsorbent 10 is placed on the surface of the base 1 in an example shown in FIG. 3, the gas adsorbent 10 may be placed on the inner surface of the concave portion of the base 1 or the surface of the fuel reformer 9. Furthermore, the adsorbent 10 may be placed in a gap between the fuel reformer 9 and the bottom plate of the concave portion of the base 1, or in a gap between the fuel reformer 9 and the side surface of the concave portion of the base 1.

Figure 4:
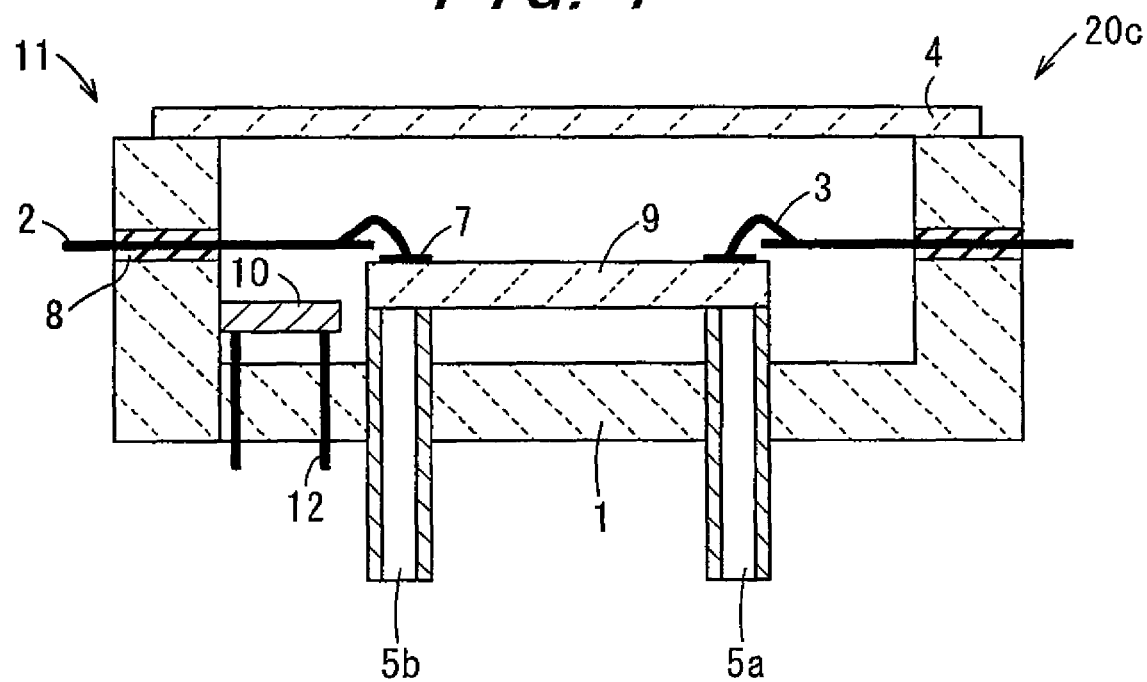
FIG. 4 is a sectional view showing a fuel reforming apparatus according to a fourth embodiment of the invention.

FIG. 4 is a sectional view showing a fuel reforming apparatus 20C according to a fourth embodiment of the invention. In the present embodiment, parts corresponding to configurations according to the above-described embodiments will be denoted by the same reference numerals so that descriptions thereof will be omitted.

The fuel reforming apparatus 20C includes a base 1, an external lead terminal 2, a lid body 4, a supply pipe 5a, a discharge pipe 5b, an insulating sealing material 8, a fuel reformer 9 having an electrode 7, a gas adsorbent 10, and a lead terminal 12. A fuel reformer housing container 11 is configured so as to house the fuel reformer 9 by using the base 1, the lid body 4, the supply pipe 5a, and the discharge pipe 5b. In the fuel reformer housing container 11, the fuel reformer 9 and the gas adsorbent 10 are housed, and a concave portion of the base 1 is hermetically sealed with the lid body 4, thus resulting in the fuel reforming apparatus 20C. The fuel reforming apparatus 20C according to the present embodiment is similar to the configuration of the fuel reforming apparatus 20 according to the first embodiment. It is notable that the inner pressure of the concave portion is set at $10^2$ Pa or less. Further, the fuel reforming apparatus 20C according to the embodiment is different from the fuel reforming apparatus 20 according to the first embodiment in that the lead terminal 12 is provided on the base 1 without the insulating sealing material 8 interposed therebetween.

In the fuel reforming apparatus 20C of the invention, the inner pressure of the concave portion is set at $10^2$ Pa or less. Accordingly, the heat released from the fuel reformer 9 can be effectively prevented from being conducted to the base 1 and the lid body 4. The inner pressure of the concave portion exceeding $10^2$ Pa causes the heat to be more easily conducted to the base 1 and the lid body 4 by the heat released from the fuel reformer 9, and moreover causes the gas adsorbent 10 to be more easily autoactivated so that the gas adsorbent 10 is liable to deteriorate in activity for a short time.

Preferably, the base 1 and the lid body 4 are jointed to each other by the welding method such as the projection method, the seam welding method, the electronic beam method, or the laser beam method. In such a welding method for joining the base 1 and the lid body 4, only the joint between the base 1 and the lid body 4 and its neighbor area are heated so that the gas adsorbent 10 can be prevented from being heated. The gas adsorbent 10 is thus not activated upon sealing the fuel reforming apparatus 11.

Further, it is preferred that the base 1 and the lid body 4 be joined to each other by the welding method under a lower pressure of $10^2$ Pa or less in order to prevent the adsorbing property of the gas adsorbent 10 from deteriorating.

The joining operation under a pressure exceeding $10^2$ Pa may cause the gas adsorbent 10 to be autoactivated by reaction heat upon adsorbing the gas around the gas adsorbent 10, resulting in progress of the activation which may cause the deterioration of the adsorbing property.

Further, a larger amount of the gas adsorbent 10 is required for decreasing the inner pressure of the fuel reformer housing container 11 to increase the level of vacuum inside the fuel reformer housing container 11, with the result that the amount of the gas adsorbent 10 may exceed a set acceptable amount of gas adsorbent inside the fuel reformer housing container 11.

Further, the joint between the base 1 and the lid body 4 and its neighbor area may be oxidized during the welding operation, which may possibly cause the outgas to be released from the oxidized areas by influences of a temperature in reforming the fuel and as time passes.

The fuel reformer 9 is formed so that the electrode 7 on the fuel reformer 9 is electrically connected to the external lead terminal 2 disposed on the base 1 via the bonding wire 3. Consequently, the heater formed on the surface of and inside the fuel reformer 9 can be heated through the electrode 7. As a result, the reaction temperature can be maintained in the fuel reformer 9, thus allowing the fuel-reforming reaction to be stabilized.

The gas adsorbent 10 is heated in a manner that electric energy is transmitted by the lead terminal from an external power source to a metal material inside the gas adsorbent so that the metal material generates heat, or in a manner that light such as infrared light or laser light is emitted to the gas adsorbent 10 through a window portion provided on the lid body 4 and the base 1 so that energy of the light is converted into thermal energy directly by the gas adsorbent 10.

The gas adsorbent 10 may be mounted on the inner surface defining the concave portion of the base 1 directly or via a pedestal, or may be mounted on the fuel reformer 9. Further, as shown in FIG. 4, the gas adsorbent may be connected to the led terminal which then transmits the electric energy from the external power source, and the electric energy may be then transmitted to the metal plate of the gas adsorbent 10 where the electric energy is converted into the thermal energy to thereby secondarily heat the gas adsorbent 10.

Note that although the gas adsorbent 10 is joined to the lead terminal 12 in an example shown in FIG. 4, the gas adsorbent 10 may be joined to an insulating pedestal made of ceramic.

Figure 5:
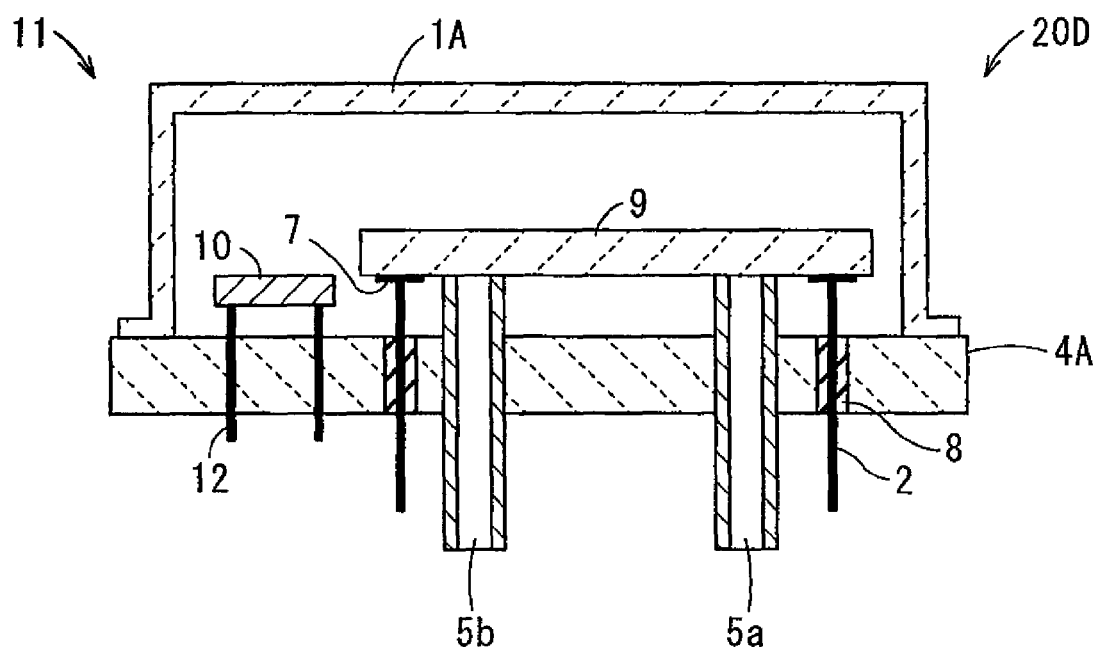
FIG. 5 is a sectional view showing a fuel reforming apparatus according to a fifth embodiment of the invention.
Figure 6:
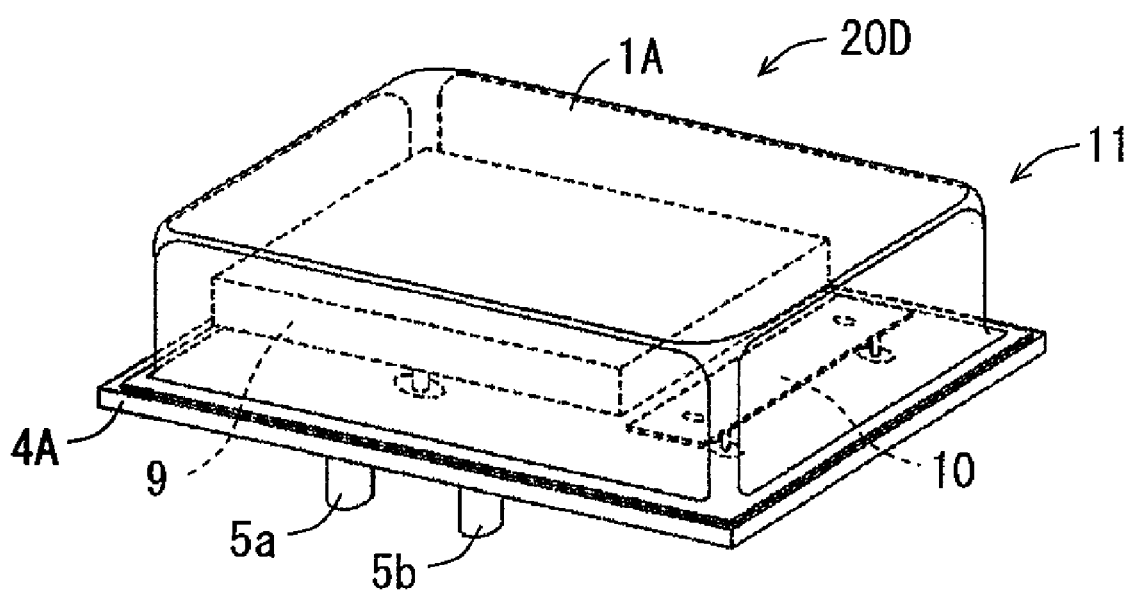
FIG. 6 is a perspective view showing the fuel reforming apparatus of FIG. 5 seen from the top.
Figure 7:
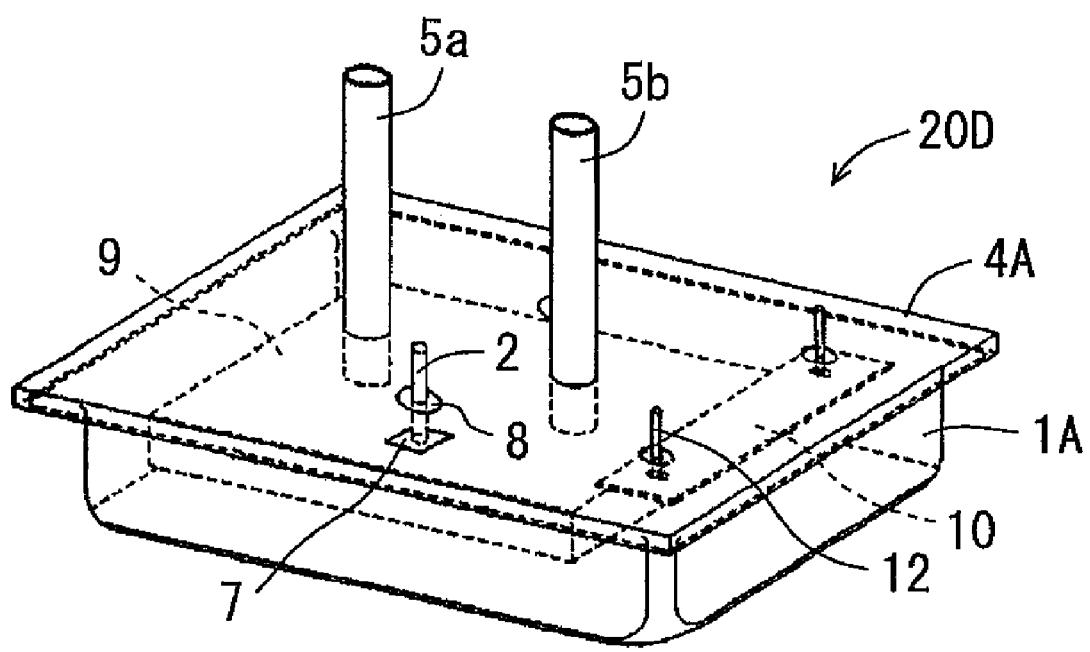
FIG. 7 is a perspective view showing the fuel reforming apparatus of FIG. 5 seen from the bottom.
Figure 8:
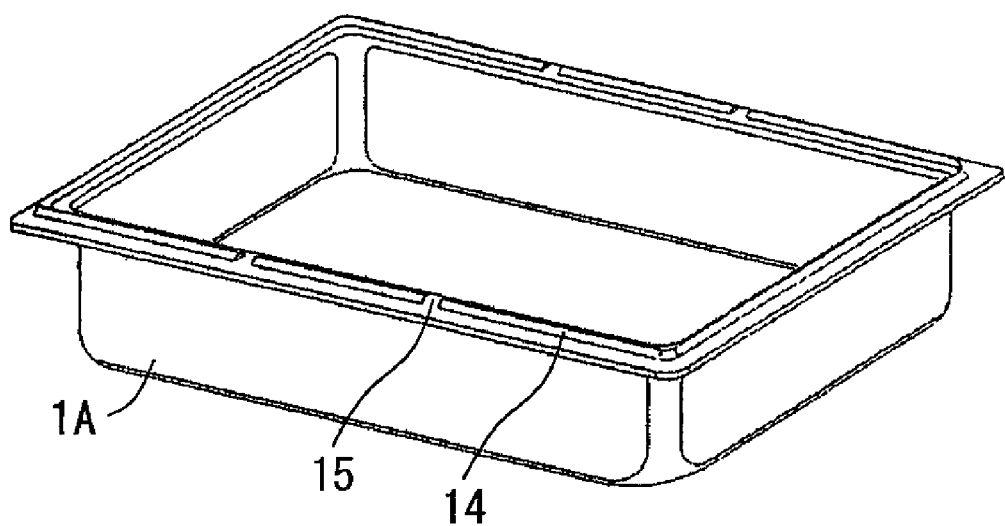
FIG. 8 is a perspective view showing a base in the fuel reforming apparatus of FIG. 5.

FIG. 5 is a sectional view showing a fuel reforming apparatus 20D according to a fifth embodiment of the invention. FIG. 6 is a perspective view showing the fuel reforming apparatus 20D of FIG. 5 seen from the top. FIG. 7 is a perspective view showing the fuel reforming apparatus 20D of FIG. 5 seen from the bottom. FIG. 8 is a perspective view showing a base 1A in the fuel reforming apparatus 20D of FIG. 5. In the present embodiment, parts corresponding to configurations according to the above-described embodiments will be denoted by the same reference numerals so that descriptions thereof will be omitted.

The fuel reforming apparatus 20D includes a base 1A, an external lead terminal 2, a lid body 4A, a supply pipe 5a, a discharge pipe 5b, an insulating sealing material 8, a fuel reformer 9 having an electrode 7, a gas adsorbent 10, and a lead terminal 12. A fuel reformer housing container 11 is configured so as to house the fuel reformer 9 by using the base 1A, the lid body 4A, the supply pipe 5a, and the discharge pipe 5b. The fuel reformer 9 is housed in the fuel reformer housing container which is hermetically sealed with the lid body 4A and the base 1A, thus resulting in the fuel reforming apparatus 20D.

Both of the base 1A and the lid body 4A in the invention have a role as a container that houses the fuel reformer 9. They are made of, for example, metal materials such as Fe-based alloys including stainless steel, Fe—Ni—Co alloy, and Fe—Ni alloy, or oxygen free copper; inorganic materials; organic materials; or a complex of these ingredients. Note that the concave portion formed in the base 1A may be formed by joining a frame body to the base 1A, or alternatively the concave portion may be formed directly in the base 1A.

In the invention, a grove 15 for discharging the gas inside the concave portion is formed in at least one of a joint between the base 1A and the lid body 4A and a joint between the lid body 4A and the base 1A. This makes it possible to sufficiently discharge the gas existing in the fuel reformer housing container 11 composed of the base 1A and the lid body 4A, from the groove 15 for exhausting air at the sealing occasion in a depressurized state, thus allowing to form a high vacuum inside the fuel reformer housing container. It is thus possible to achieve an effective thermal insulation which can largely reduce heat being conducted from the fuel reformer 9 to outer surfaces of the base 1A and the lid body 4A. Accordingly, a temperature of outer surface of the fuel reformer housing container 11 can be effectively prevented from rising. As a result, it is possible to effectively prevent the other components inside a mobile equipment from being broken. Note that although FIG. 8 shows an example in which the groove 15 is formed in a joint surface of the base 1A to the lid body 4A, the configuration is not limited thereto and the groove 15 may be formed in a joint surface of the lid body 4A to the base 1A.

Furthermore, in an example shown in FIG. 8, a joint of the base 1A to the lid body 4A is formed so as to protrude all around the circumference, and this protruded part (generally, the protruded part is also referred to as a projection. This protruded part will be also referred to a projection hereinbelow.) 14 is partially notched to thereby form the groove 15. Accordingly, when the lid body 9A and the base 1A are joined to each other by the welding method with the heat generated only in the joint of the lid body 4A to the base 1A, it is possible to concentrate the heat on the projection 14, resulting in an increase in joint efficiency. At the same time, the heat can be effectively prevented from being transmitted to the base 1A or the lid body 4A so that the other components in the fuel reformer housing container 11 or the other components disposed outside the fuel reformer housing container 11 will not be impaired and so that the fuel reformer housing container 11 will not be strained, resulting in no defective sealing.

The base 1A and the lid body 4A as described above are formed into predetermined shapes by a cutting method, a pressing method, an MIM (Metal Injection Mold) method or the like method.

It is preferred that a width of the groove 15 of the projection 14 formed in at least one of the base 1A and the lid body 4A be 0.05 mm to 5 mm. This makes it possible to exhaust the air inside the fuel reformer housing container 11 and to carry out the hermetic sealing at the sealing occasion under the depressurized state. As a result, the heat transmitted from the fuel reformer 9 to the base 1A and the lid body 4A can be effectively reduced so that the temperature of the fuel reformer 9 can be prevented from decreasing to thus reduce the power generation loss and moreover, the temperature of the fuel reformer housing container 11 can be more effectively prevented from rising.

Further, in order to prevent the base 1A and the lid body 4A from corroding, it is desirable to apply to surfaces of the base 1A and the lid body 4A a plating treatment with Au or Ni, a coating treatment such as resin coating which uses polyimide and the like resin, or the like treatment. For example, in the case of Au plating treatment, it is desired that the thickness is approximately 0.1 to 5 μm.

In order to make the fuel reformer housing container 11 be smaller in size and lower in height, the base 1A and the lid body 4A as described above should be formed thin, of which mechanical strength, i.e. a bending strength is preferably 200 MPa or more.

Further, it is preferred that the lid body 4A and the base 1A be each made of a metal material of which thermal conductivity is 120 W/mK or less. Accordingly, the heat emitted from the fuel reformer 9 can be prevented from being conducted to the lid body 4A and the base 1A so that the temperatures of the surface of lid body 4A and the surface of base 1A can be more effectively prevented from rising. It is thus possible to more effectively prevent the other components inside the fuel reformer housing container 11 and the other components outside the fuel reformer housing container 11 from being impaired so that the fuel cell system can be used stably and safely for a long period of time. Examples of the metal material of which thermal conductivity is 120 W/mK or less include, for example, stainless steel, Fe—Ni—Co alloy, and Fe—Ni alloy.

The electrode 7 on the fuel reformer 9 and the external lead terminal 2 are electrically connected to each other, and the lid body 4A and the base 1A are joined to each other, thereby forming the fuel reforming apparatus 20D which hermetically seals the fuel reformer 9 housed in the fuel reformer housing container 11. In the fuel reforming apparatus 20D of the invention, the base LA and the lid body 4A are joined to each other by welding or the like method, and at the welding occasion, an inner surface defining the groove 15 is fused to close the groove 15. This makes it possible to sufficiently discharge the gas existing in the fuel reformer housing container from the groove 15 when the lid body 4A and the base 1A are joined to each other in the depressurized state, thus exhausting the air existing in the fuel reformer housing container so that a high vacuum can be formed inside the fuel reformer housing container. At the same time, even when the heat applied upon joining the lid body 4A and the base 1A strains the base 1A or the lid body 4A, thus generating stress, a part defining the groove 15 is appropriately deformed so that the stress can be absorbed, with the result that the defective sealing can be effectively prevented from arising.

For joining the base 1A and the lid body 4A, it is possible to use the welding methods such as resistance welding or welding effected by laser irradiation, a brazing method, etc. In the case of the welding method, the welding is made to proceed while the internal gas is discharged by way of the groove 15, and when the welding finally reaches the vicinity of the groove 15, the welding causes the inner surface defining the groove 15 to be fused, thereby closing the groove 15.

Further, in the case of the brazing method, a brazing material is previously applied to a part except the groove 15, and after the brazing material is wet and spread between the base 1A and the lid body 4A, the brazing material is finally spread over the groove 15, thereby closing the groove 15. Alternatively, the brazing material may be previously applied to also the inner surface defining the groove 15. In this case, it is necessary to secure a sufficient passage for exhausting the gas existing in the groove 15 so that the groove 15 is not closed upon the joining occasion.

As described above, in the welding method and the brazing method, the groove 15 is closed at the end so that the gas in the fuel reformer housing container 11 can be favorably exhausted by the groove 15.

Preferably, the base 1A and the lid body 4A are joined to each other by welding, and the inner surface defining the groove 15 is fused upon joining the base LA and the lid body 4A so that the groove 15 is closed. This makes it possible to generate heat only on the joint between the lid body 4A and the base 1A so that the lid body 4A and the base 1A are joined to each other. Further, the heat is prevented from being transmitted to the base 1A or the lid body 4A so that the other components inside the fuel reforming apparatus 20D or the other components outside the fuel reforming apparatus 20D will not be impaired and so that the fuel reformer housing container 11 will not be strained, resulting in no defective sealing.

Further, the lid body 4A and the base 1A are welded in a manner that a part except the groove 15 is welded earlier and the groove 15 is closed at the end while the exhaustion is carried out by the groove 15, with the result that the groove 15 can be prevented from being filled during the welding and the efficiency of exhaust can be thus prevented from decreasing, resulting in a higher level of vacuum inside the fuel reformer housing container 11.

The fuel reformer 9 is electrically connected to the external lead terminal 2 by connecting the electrode 7 on the fuel reformer 9 to the external lead terminal 2 provided on the base 1A. This makes it possible to heat a heater formed on the surface of and inside the fuel reformer 9 through the electrode 7. As a result, the reaction temperature can be maintained in the fuel reformer 9 so that the fuel-reforming reaction can be stabilized.

Preferably, the gas adsorbent 10 is disposed along the inner surface defining the concave portion near the groove 15.

Accordingly, the groove 15 is used for exhausting the air upon joining the base 1A and the lid body 4A to each other, and the gas adsorbent 10 is brought close to the part defining the groove 15 to which the air is liable to be deposited when the groove 15 is being closed, thus allowing the air deposited on the part defining the groove 15 to be efficiently adsorbed by the gas adsorbent 10 promptly. That is to say, the efficiency of adsorbing the gas can be increased to a very high level by preventing a vicious circle such that the air deposited on the part defining the groove 15 is released into the fuel reformer housing container and then deposited again on the other parts.

In the fuel reforming apparatus 20D of the invention, the fuel reforming apparatus 20C according to the fourth embodiment of the invention, the inner pressure of the fuel reformer housing container 11, that is, the inner pressure of the concave portion is preferably set at $10^2$ Pa or less.

Preferably, the base 1A and the lid body 4A are joined to each other by the resistance welding method. In joining the base 1A and the lid body 4A to each other by the welding method, only the joint between the base 1A and the lid body 4A and its neighbor are heated. Accordingly, the gas adsorbent 10 can be prevented from being heated and is never activated upon sealing the fuel reformer housing container 11.

Further, it is preferred that the base 1A and the lid body 4A be joined to each other under a pressure of $10^2$ Pa or less. Joining the base 1A and the lid body 4A under the pressure of $10^2$ Pa or less makes it possible to increase the level of vacuum inside the fuel reformer housing container 11. It is thus possible to effectively prevent the heat from being transmitted from the fuel reformer 9 to the base 1A and the lid body 4A.

Further, in the case where the gas adsorbent 10 is housed in the fuel reformer housing container, the gas adsorbent 10 can be effectively prevented from being autoactivated by the reaction heat generated upon adsorbing the gas around the gas adsorbent 10 which usually results in progress of the activation causing the deterioration of the adsorbing property. Further, when the inner pressure is decreased and the level of vacuum is increased in the fuel reformer housing container, the gas adsorbent 10 can be effectively prevented from having its acceptable gas-adsorbing amount approaching to the limit so that the adsorbing function of the gas adsorbent 10 can be favorably maintained.

Note that the outgas released into the fuel reformer housing container after the fuel reformer housing container is hermetically sealed means gas adsorbed on surfaces of various components inside the fuel reformer housing container such as the inner surface of the fuel reformer housing container or the surface of the fuel reformer itself, or gas released from the joint between the base 1A and the lid body 4A and a part surrounding the joint which are oxidized at the welding occasion, by influences of a temperature in reforming the fuel and as time passes. As described above, the level of vacuum inside the fuel reformer housing container 11 can be enhanced further by sealing the fuel reformer housing container under the pressure of $10^2$ Pa or less and thereafter absorbing the outgas by the gas adsorbent 10.

Note that the supply pipe 5a and the discharge pipe 5b may penetrate the base 1A or the lid body 4A. Alternatively, the supply pipe 5a and the discharge pipe 5b may be nipped in a joining interface between the base 1A and the lid body 4A to thereby communicate the inside of the concave portion with outside thereof.

Note that although the gas adsorbent 10 is joined to the lead terminal 12 in an example shown in FIG. 5, the adsorbent 10 may be fixed on an insulating pedestal made of, for example, ceramic.

Figure 9:
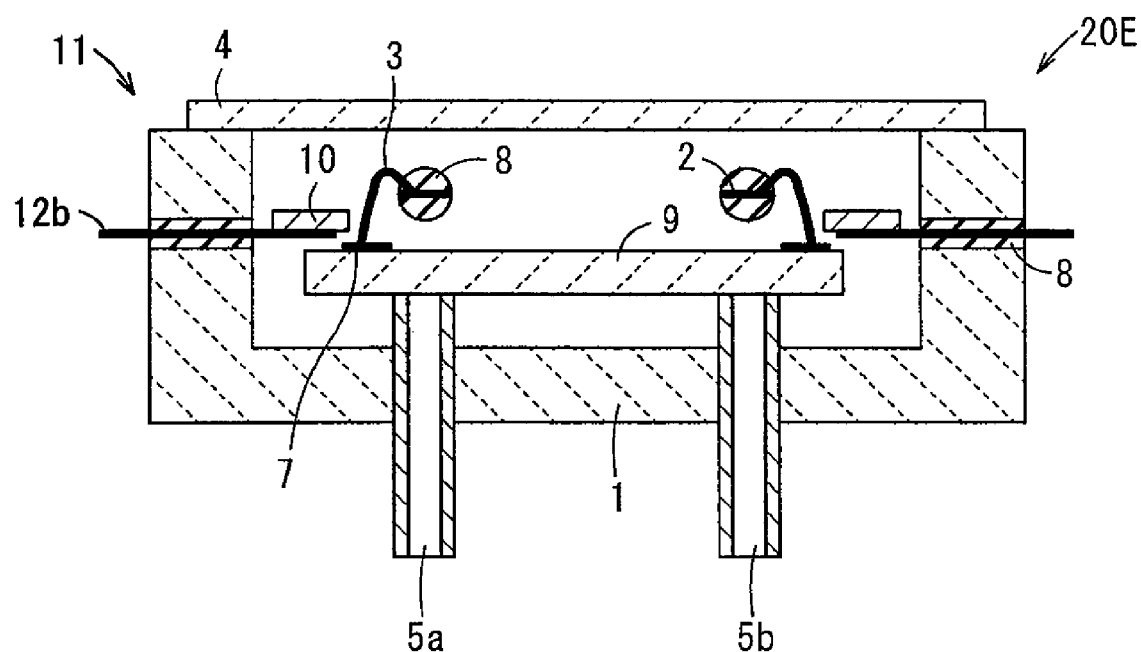
FIG. 9 is a sectional view showing a fuel reforming apparatus according to a sixth embodiment of the invention.
Figure 10:
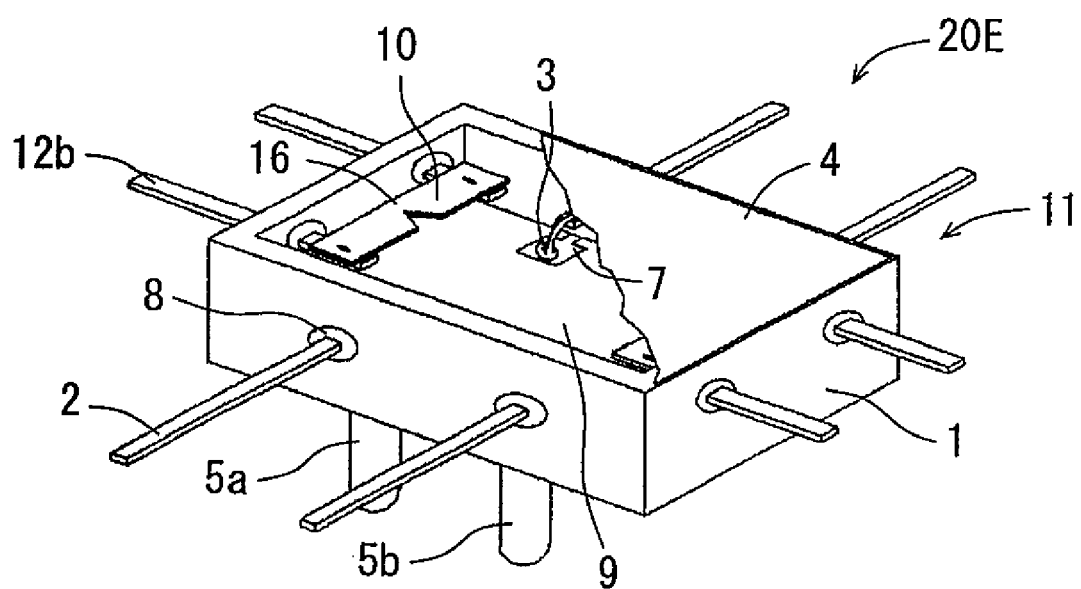
FIG. 10 is perspective view showing the fuel reforming apparatus of FIG. 9 seen from the top, having a part of a lid body taken out.
Figure 11:
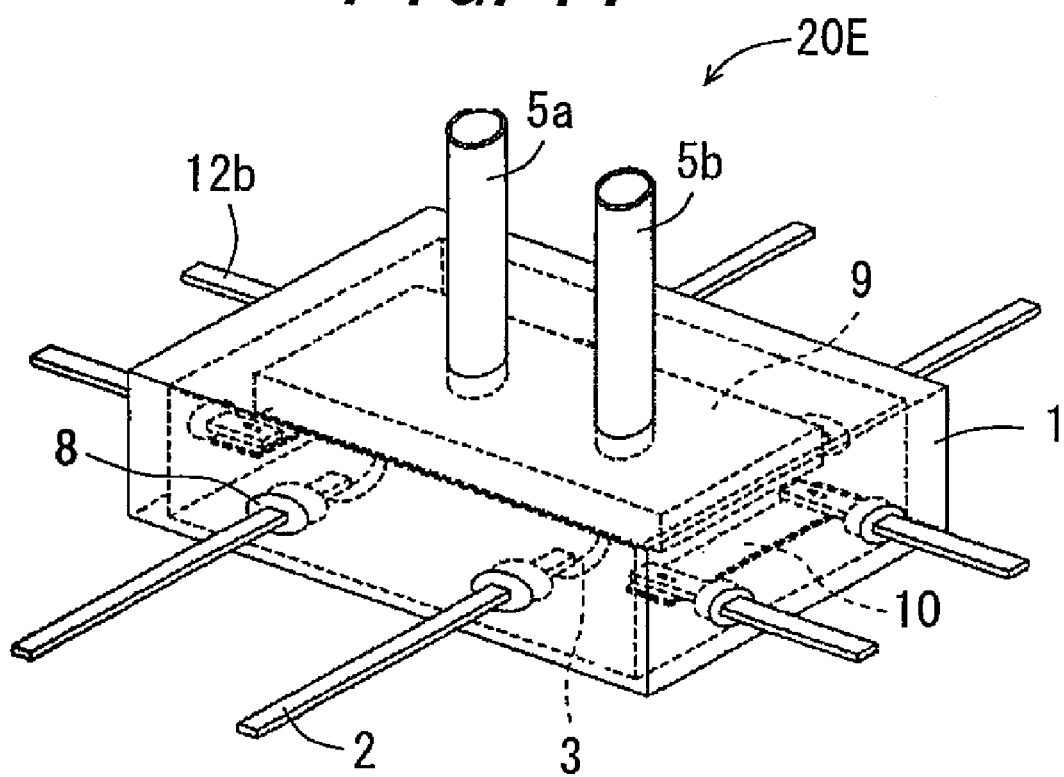
FIG. 11 is a perspective view showing the fuel reforming apparatus of FIG. 8 seen from the bottom.
Figure 12:
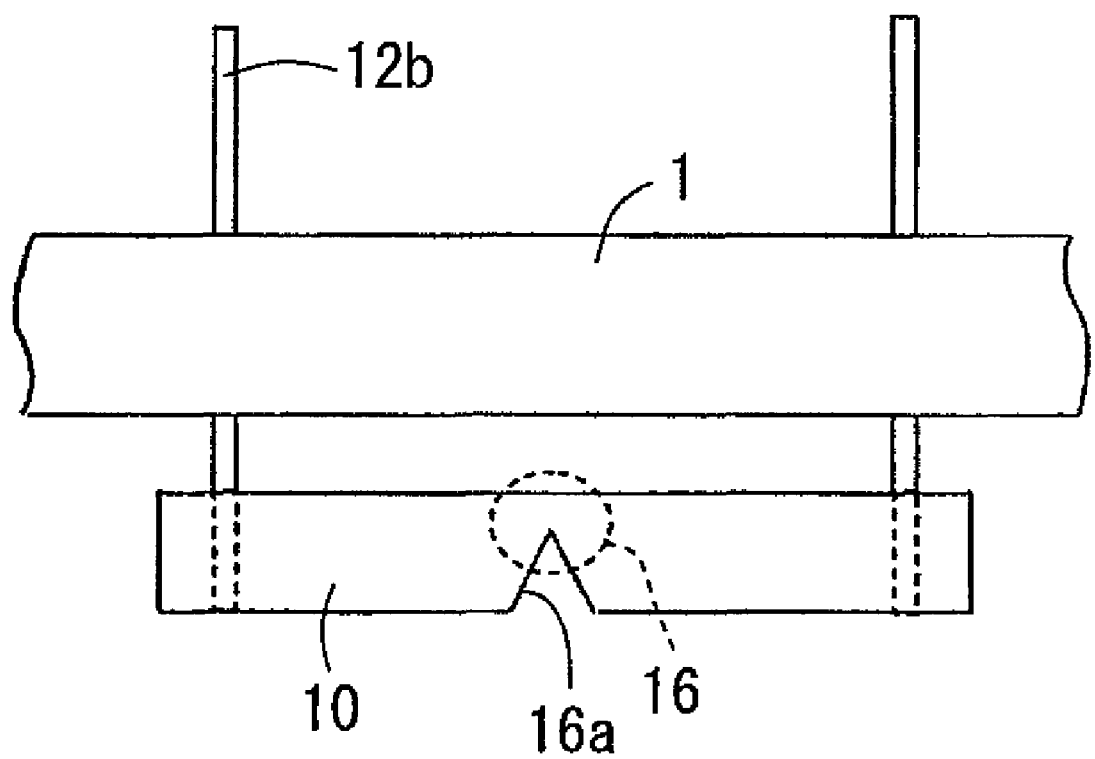
FIG. 12 is an enlarged plan view showing a part of a gas adsorbent in the fuel reforming apparatus of FIG. 9.
Figure 13:
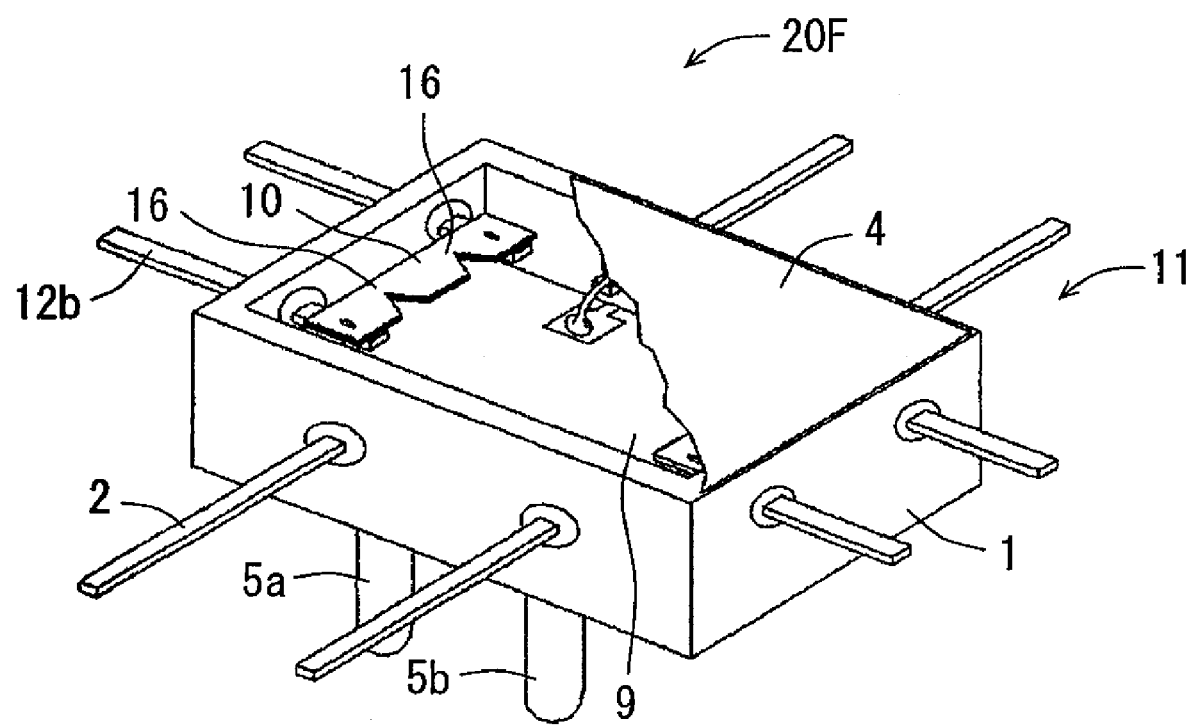
FIG. 13 is a perspective view showing a fuel reforming apparatus according to a seventh embodiment of the invention, having a part of a lid body taken out.
Figure 14:
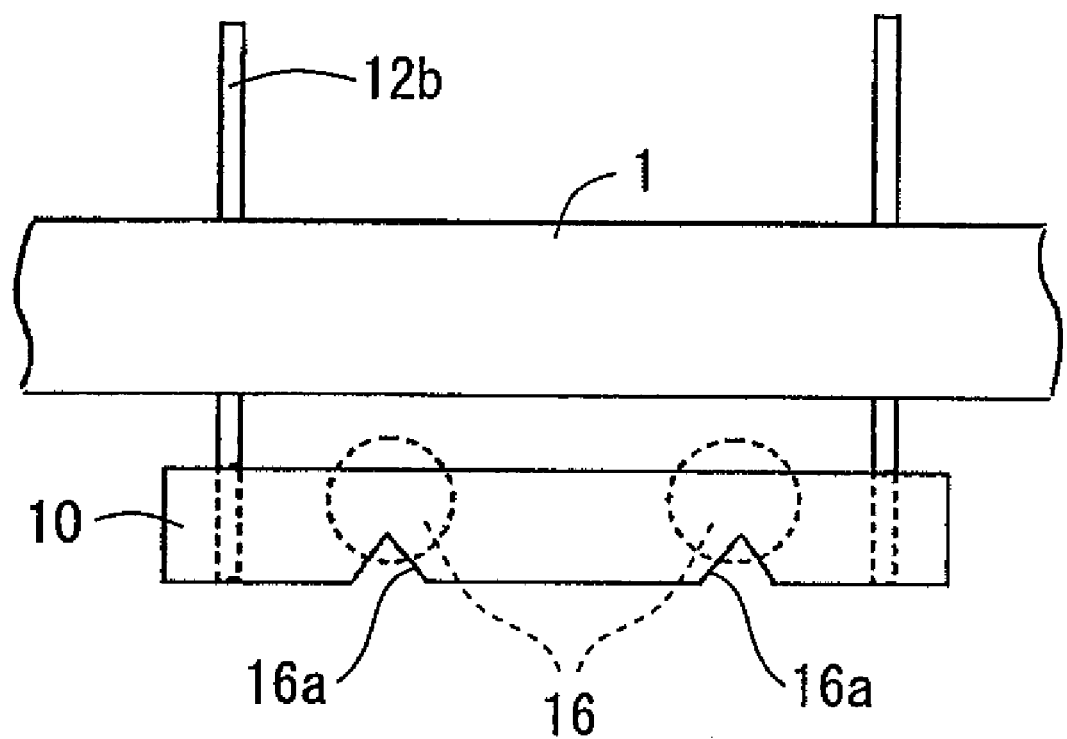
FIG. 14 is an enlarged plane view showing a part of a gas adsorbent in the fuel reforming apparatus of FIG. 13.

FIG. 9 is a sectional view showing a fuel reforming apparatus 20E according to a sixth embodiment of the invention. FIG. 10 is perspective view showing the fuel reforming apparatus 20E of FIG. 9 seen from the top, having a part of the lid body 4 taken out. FIG. 11 is a perspective view showing the fuel reforming apparatus 20E of FIG. 9 seen from the bottom. FIG. 12 is an enlarged plan view showing a part of the gas adsorbent 10 in the fuel reforming apparatus 20E of FIG. 9. FIG. 13 is a perspective view showing a fuel reforming apparatus 20F according to a seventh embodiment of the invention, having a part of the lid body 4 taken out. FIG. 14 is an enlarged plane view showing a part of the gas adsorbent 10 in the fuel reforming apparatus 20F of FIG. 13.

In the present embodiment, parts corresponding to configurations according to the above-described embodiments will be denoted by the same reference numerals so that descriptions thereof will be omitted.

The fuel reforming apparatus 20E includes a base 1, an external lead terminal 2, a lid body 4A, a supply pipe 5a, a discharge pipe 5b, an insulating sealing material 8, a fuel reformer 9 having an electrode 7, a gas adsorbent 10, and a lead terminal 12b. A fuel reformer housing container 11 is configured so as to house the fuel reformer 9 by using the base 1, the lid body 4, the supply pipe 5a, and the discharge pipe 5b. The fuel reformer 9 and the gas adsorbent 10 are housed in the fuel reformer housing container 11 of which concave portion is hermetically sealed with the lid body 4, thus resulting in the fuel reforming apparatus 20E. The lead terminal 12b is configured in the same manner as the lead terminal 12 according to the above-described embodiment, except that the lead terminal 12b is provided in a through-hole formed in a side wall which is different from a side wall having the penetrating external lead terminal 2, among four side walls having inner surfaces defining the concave portion of the base 1, and the lead terminal 12b is provided in the base 1 by way of the insulating sealing material 8.

The gas adsorbent 10 enhances the level of vacuum by using gas adsorption effected by chemically-active metal powder. The gas adsorbent 10 is fabricated by making one surface or both surfaces of the belt-like metal plate formed of Ni—Cr or the like ingredient having a thickness of, for example, around 10 to 500 µm carry metal powder containing Zr, Fe, V, or the like component as chief constituents, which metal powder will have a thickness of 10 µm to 1 mm. The gas adsorbent 10 is attached by the spot welding or the like method to the lead terminal 12b fixed on the base 1 or the lid body 4 so as to communicate the inside of the concave portion of the base 1 with outside thereof.

The lead terminal 12b serves for the energization of the metal plate of the gas adsorbent 10. The metal particle deposited on the surface of the metal plate can be heated and thus activated by the lead terminal 12b and the metal plate which generates resistance heat in the energization. For example, the lead terminals 12b are respectively connected to both ends of the gas adsorbent 10, and a voltage is applied between the lead terminals 12b connected to the both ends, thereby allowing the gas adsorbent 10 to be energized.

And in the gas adsorbent 10 of the invention, a high-resistance portion 16 is formed in a part of an energized portion in the metal plate constituting the gas adsorbent 10, the high-resistance portion 16 of which sectional area cut in a direction orthogonal to an energizing direction is smaller than those of the other parts. Herein, the energized portion of the metal plate indicates a part which carries a current inputted and outputted by the lid terminal 12b electrically connected to the metal plate for energizing the metal plate, that is, a part which is located between the lead terminal 12*b* for current input and the lead terminal 12*b* for current output in the metal plate.

By virtue of this configuration, a part having high resistance is formed locally in the metal plate, and the part having high resistance efficiently generates heat to thereby allow the metal powder deposited on the surface of the metal plate to be activated at a high efficiency, so that a value of current applied for activation of the gas adsorbent 10 can be decreased. As a result, the electric power for heating the gas adsorbent 10 can be reduced, and the efficiency of power generation of the fuel cell system using the fuel reformer housing container 11 can be enhanced.

Further, the gas adsorbent 10 can be activated efficiently by the high-resistance portion 16, and it is therefore possible to maintain a gas adsorbing function which is sufficient for maintaining the favorable vacuum state inside the fuel reformer housing container 11 even with a smaller gas adsorbent 10. Accordingly, a space for housing the gas adsorbent 10 can be reduced in size so that the fuel reformer housing container 11 can be smaller in size and lower in height and furthermore, the fuel cell system equipment for mobile device using the fuel reformer housing container 11 can be smaller in size and lower in height.

The high-resistance portion 16 only needs to be formed so that a sectional area thereof cut in a direction orthogonal to the energizing direction of the metal plate is smaller than those of the other parts. The high-resistance portion 16 is therefore formed by various methods such as to form a notch 16*a* crossing the energizing direction in the metal plate and to form a thinner metal plate.

Further, it is preferred that the high-resistance portion 16 be formed by providing the notch 16*a* as shown in FIG. 12 on the energized portion of the metal plate. Accordingly, even in the case where the gas adsorbent 10 is deformed due to influences of the heat generated in the activation through the energization effected by the lead terminal 12*b* connected to the gas adsorbent 10, the notch 16*a* can reduce the deformation and prevent the stress from arising in the connection between the gas adsorbent 10 and the lead terminal 12*b*. As a result, it is possible to effectively prevent the connection between the lead terminal 12*b* and the gas adsorbent 10 from being damaged, and to effectively prevent the gas adsorbent 10 from falling off from the lead terminal 12*b*.

A shape of the notch 16*a* provided in the metal plate of the gas adsorbent 10 may vary, including a V shape, a square shape, and a round shape. The notch 16*a* may be formed in one part as shown in FIGS. 10 and 12 while the notches 16*a* may be formed in plural parts as in the case of the fuel reforming apparatus 20F according to the seventh embodiment of the invention shown in FIGS. 13 and 14. In this case, the notch 16*a* is preferably provided at a middle portion of the gas adsorbent 10 or at regular intervals over the full length of the gas adsorbent 10 so that the heat generated from the notch 16*a* in the energization can be transmitted evenly to the entire gas adsorbent 10.

The gas adsorbent 10 having the notch 16*a* is shaped by a method of pressing a metal plate made of Ni—Cr and the like ingredient carrying metal powder containing Zr, Fe, V, and the like ingredient as chief constituents, into a predetermined shape; a cutting method using laser or the like means; or a method in which the metal plate made of Ni—Cr and the like ingredient that has been previously processed into a predetermined shape by the above method and thereafter is made to carry the metal powder containing Zr, Fe, V, and the like ingredient as chief constituents.

Preferably, the gas adsorbent 10 is disposed so as to face the fuel reformer 9, and the notch 16*a* is disposed so as to face the fuel reformer 9. By so doing, the heat of the gas adsorbent 10 can be radiated to the fuel reformer 9 by moving the notch 16*a* of the gas adsorbent 10, which generates a particularly large amount of heat, close to the fuel reformer 9, and can thus contribute to an increase in temperature of the fuel reformer 9 so that the electric power being supplied for maintaining the high temperature of the fuel reformer 9 can be reduced. As a result, the efficiency of power generation of the fuel cell system using the fuel reformer housing container 11 can be further enhanced.

Further, in order to provide the fuel reformer housing container 11 with the heat insulating property, it is preferable to form a vacuum inside the fuel reformer housing container 11 as much as possible. Methods of forming the vacuum inside the fuel reformer housing container 11 include, for example, a method of sealing the fuel reformer housing container 11 by brazing the lid body 4 thereon in a vacuum furnace, or a method of welding the lid body 4 onto the fuel reformer housing container 11 in a vacuum furnace by using the seam welding method.

Subsequently, the gas adsorbent 10 is energized through the lead terminal 12 and thereby heated and activated. As the activation condition, the gas adsorbent 10 is heated at a temperature of 350 to 900° C., thus resulting in a nearly 100%-activated state.

Further, the gas adsorbent 10 may be fixed only on the lead terminal 12*b* and disposed so as to be distanced away from the base 1, the lid body 4, or the fuel reformer 9.

Further, the present example shows the metal plate of the gas adsorbent 10 having a platy shape as shown in FIGS. 10 and 13. However, the shape of the metal plate of the gas adsorbent 10 is not limited to the platy shape, and may be columnar or may have a bent part. Further, the notch 16*a* having a groove shape may be formed in the metal plate.

Figure 15:
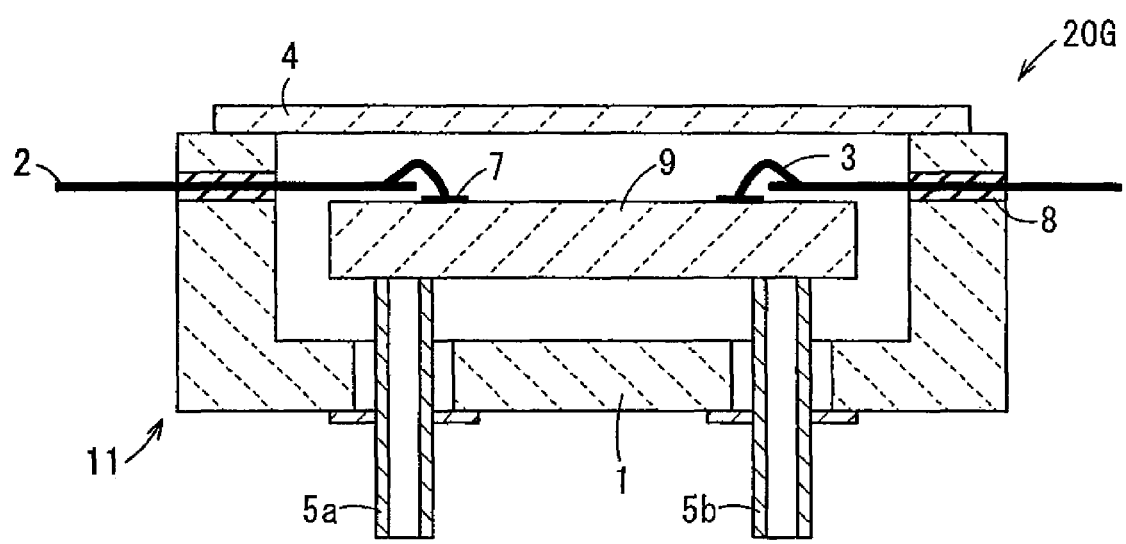
FIG. 15 is a sectional view showing a fuel reforming apparatus according to an eighth embodiment of the invention.

FIG. 15 is a sectional view showing a fuel reforming apparatus 20G according to an eighth embodiment of the invention. In the present embodiment, parts corresponding to configurations according to the above-described embodiments will be denoted by the same reference numerals so that descriptions thereof will be omitted.

The fuel reforming apparatus 20G includes a base 1, an external lead terminal 2, a lid body 4A, a supply pipe 5*a*, a discharge pipe 5*b*, an insulating sealing material 8, and a fuel reformer 9 having an electrode 7. A fuel reformer housing container 11 is configured so as to house the fuel reformer 9 by using the base 1, the lid body 4, the supply pipe 5*a*, and the discharge pipe 5*b*. The fuel reformer 9 is housed in the fuel reformer housing container 11, and a concave portion of the base 1 is hermetically sealed with the lid body 4, thus resulting in the fuel reforming apparatus 20G.

Figure 16:
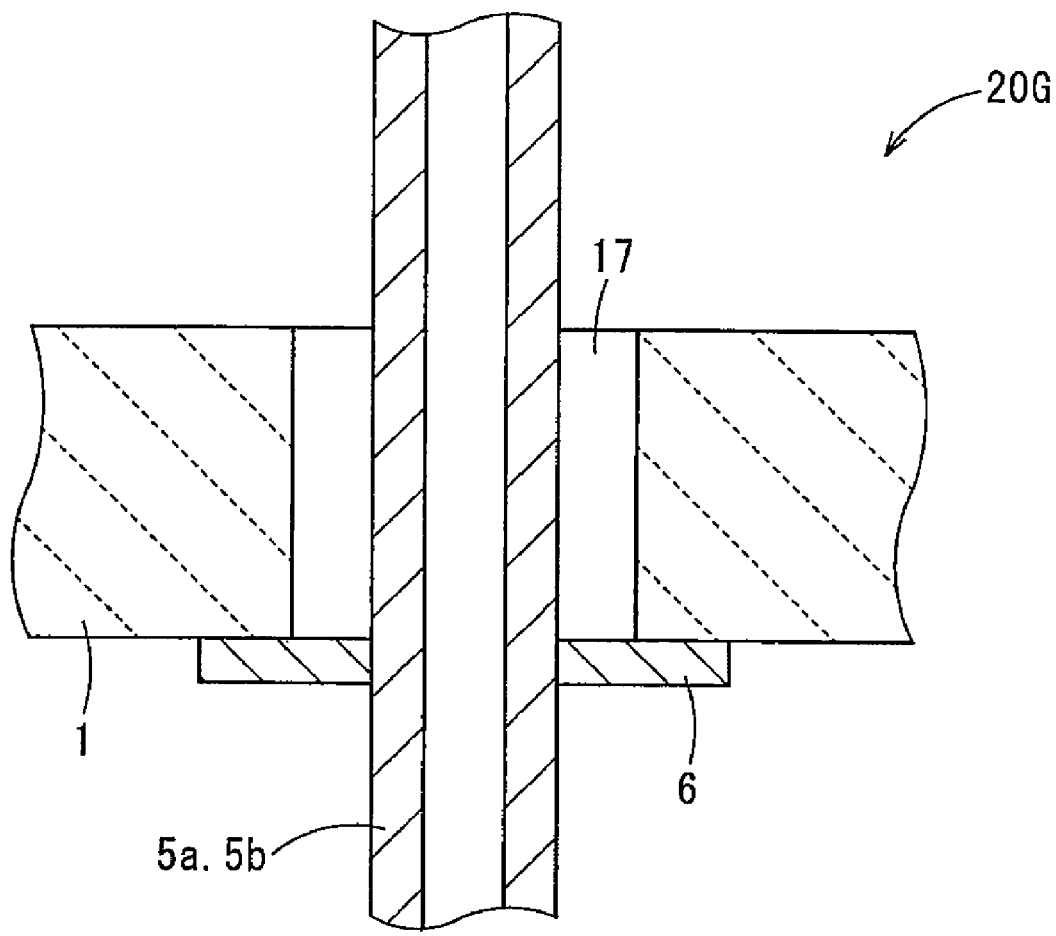
FIG. 16 is an enlarged sectional view of chief part showing a joint between a supply pipe or discharge pipe and a base in the fuel forming apparatus of FIG. 15.

FIG. 16 is an enlarged sectional view of chief part showing the joint between the supply pipe 5*a* or discharge pipe 5*b* and the base 1 in the fuel forming apparatus 20G of FIG. 15. In FIGS. 15 and 16 is shown one example of embodiment of the supply pipe 5*a* or the discharge pipe 5*b* in which a flange portion 6 is provided outside. There is provided an air gap 17 between outside of the supply pipe 5*a* or the discharge pipe 5*b* and the through-hole of the base 1.

The supply pipe 5*a* or the discharge pipe 5*b* is joined to the base 1 or the lid body 4 so as to have the air gap 17 between the base 1 or lid body 4 and the through-hole formed in the base 1 or lid body 4. The air gap 17 as described above can be formed between an outer surface of the supply pipe 5*a* or discharge pipe 5*b* and an inner surface of the through-hole by joining the flange portion 6 to a peripheral portion of the through-hole of the base 1 or lid body 4 in the case where the supply pipe 5a or discharge pipe 5b has the flange portion 6 as shown in FIGS. 15 and 16, for example.

Figure 17:
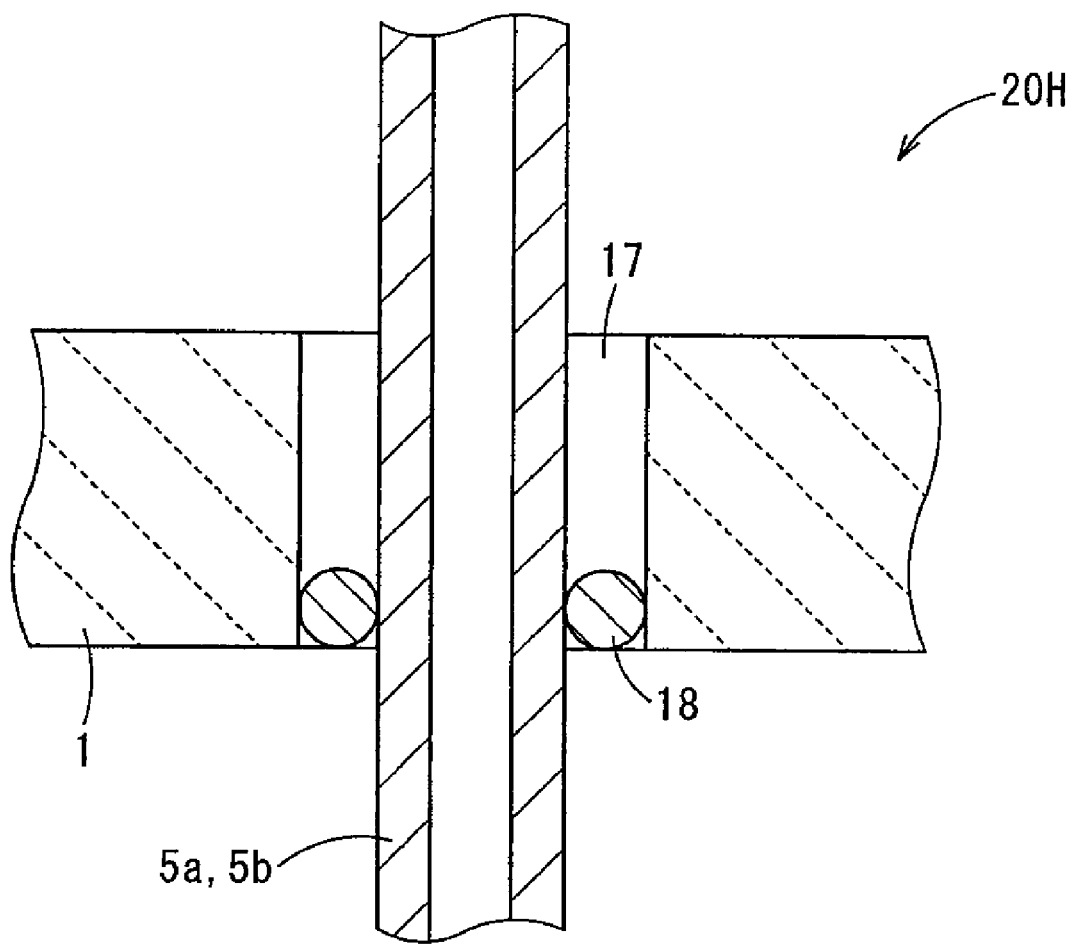
FIG. 17 is an enlarged sectional view of chief part showing a joint between a supply pipe or discharge pipe and a base in a fuel forming apparatus according to a ninth embodiment of the invention.
Figure 18:
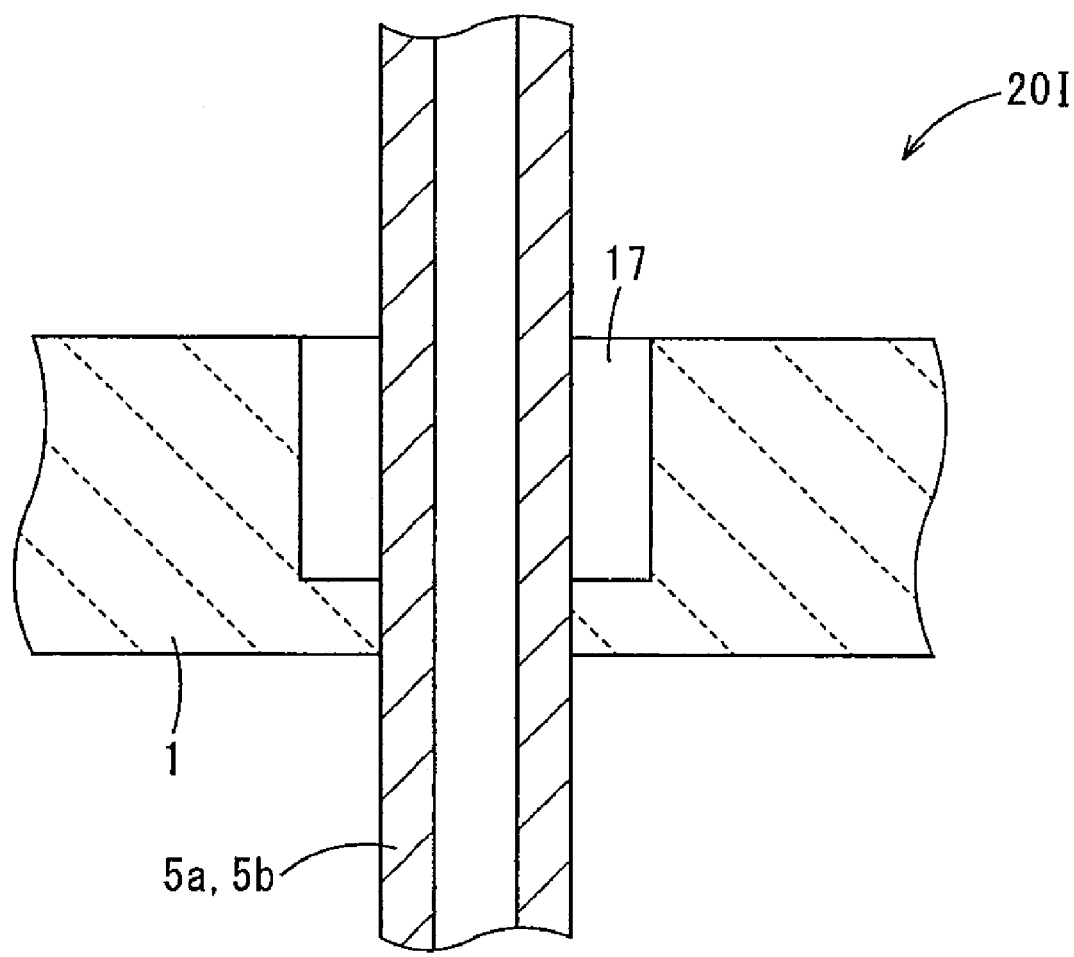
FIG. 18 is an enlarged sectional view of chief part showing a joint between a supply pipe or discharge pipe and a base in a fuel forming apparatus according to a tenth embodiment of the invention.

FIG. 17 is an enlarged sectional view of chief part showing a joint between a supply pipe 5a or discharge pipe 5b and a base 1 in a fuel forming apparatus 20H according to a ninth embodiment of the invention. Further, as shown in FIG. 17, an air gap 17 may be formed by joining only a part of an outer surface of the supply pipe 5a or discharge pipe 5b to an inner surface of a through-hole of the base 1 or lid body 4 by way of a brazing material or a sealing material 18. FIG. 18 is an enlarged sectional view of chief part showing a joint between a supply pipe 5a or discharge pipe 5b and a base 1 in a fuel forming apparatus 20I according to a tenth embodiment of the invention. Furthermore, as shown in FIG. 18, an air gap 17 may be formed by providing a step in a through-hole of the base 1 or lid body 4 and then joining the supply pipe 5a or discharge pipe 5b to the step through brazing, welding, or the like method.

Further, a width of the air gap 17 between the outer surface of the supply pipe 5a or discharge pipe 5b and the inner surface of the through-hole of the base 1 or lid body 4 is preferably set at 0.01 mm or more. In the case where only the outer surface of the supply pipe 5a or discharge pipe 5b is joined to the inner surface of the through-hole of the base 1 or lid body 4 by way of a brazing material 13 as shown in FIG. 17, the width of the air gap 17 is preferably set at 0.01 to 0.3 mm. The width of the air gap 17 which is shorter than 0.01 mm may cause the supply pipe 5a or discharge pipe 5b to come into contact with the inner surface of the through-hole when the supply pipe 5a or discharge pipe 5b is inserted into the base 1 or lid body 4, and moreover make it difficult to secure the air gap 17 by the brazing material such as Au—Sn and Ag—Cu which fills the air gap 17 between the supply pipe 5a or discharge pipe 5b and the through-hole attributable to the capillarity. As a result, the heat generated by the fuel reformer 9 is transmitted from the supply pipe 5a or discharge pipe 5b to the base 1, thus leading an increase in a temperature of a surface of outer wall of the fuel reformer housing container 11, which causes the other components inside the mobile equipment to be more easily broken. On the other hand, the width of the air gap 17 which is longer than 0.3 mm makes it difficult to braze the supply pipe 5a or discharge pipe 5b on the inner surface of the through-hole of the base 1 or lid body 4.

Further, in the case where the flange portion 6 is provided on the outer surface of the supply pipe 5a or discharge pipe 5b as shown in FIGS. 15 and 16, the width of the air gap 17 between the outer surface of the supply pipe 5a or discharge pipe 5b and the inner surface of the through-hole of the base 1 or lid body 4 is set at preferably 0.01 mm or more and more preferably 0.01 to 5 mm. The width of the air gap 17 which is shorter than 0.01 mm may cause the supply pipe 5a or discharge pipe 5b to come into contact with the inner surface of the through-hole when the supply pipe 5a or discharge pipe 5b is inserted into the base 1 or lid body 4, and moreover make it difficult to secure the air gap 17 by the brazing material such as Au—Sn and Ag—Cu which fills the air gap 17 between the supply pipe 5a or discharge pipe 5b and the through-hole attributable to the capillarity. As a result, the heat generated by the fuel reformer 9 is transmitted from the supply pipe 5a or discharge pipe 5b to the base 1, thus leading an increase in the temperature of the surface of outer wall of the fuel reformer housing container 11, which causes the other components inside the mobile equipment to be more easily broken. On the other hand, the width of the air gap 17 which is longer than 5 mm tends to make the flange portion 6 larger, with the result that the deformation of the flange portion 6 and the like tend to be generated more easily. Further, also the fuel reformer housing container 11 itself is liable to be larger, thus posing impediments for the decrease in size and height.

Further, an outer diameter of the flange portion 6 is preferably set to be longer than a diameter of the through-hole of the base 1 and lid body 4 into which the supply pipe 5a or discharge pipe 5b is inserted, by 1 mm or more, from the perspective of works such as brazing or welding or for the purpose of preventing the flange portion 6 from being deformed. Further, it is preferred that a thickness of the flange portion 6 be set at 0.1 mm or more in order to prevent its deformation. Moreover, the flange portion 6 of the supply pipe 5a or discharge pipe 5b is preferably provided with a projection all around the circumference in order to be joined to the base 1 by the welding method.

Note that although the flange portion 6 is directly joined to the supply pipe 5a or discharge pipe 5b in the example shown in FIGS. 15 and 16, it is possible to use a tubular member in communication with the supply pipe 5a or discharge pipe 5b, of which section has a circular shape or a multangular shape and which is provided with the flange portion 6 and joined to the base 1 or lid body 4.

The invention may be embodied in other various forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

According to the invention, a fuel reformer housing container comprises a base having a concave portion for housing a fuel reformer in which reformed gas containing hydrogen gas is generated from fuel; a discharge pipe for communicating inside of the concave portion with outside thereof to discharge the reformed gas from the fuel reformer; a supply pipe for communicating inside of the concave portion with outside thereof to supply the fuel to the fuel reformer; a lid body joined to the base so as to cover the concave portion of the base; and a gas adsorbent housed in the concave portion, for adsorbing gas in the concave portion. Consequently, even when the gas adsorbed to an inner surface of the fuel reformer housing container or surfaces of various components inside the fuel reformer housing container such as a surface of the fuel reformer itself is released, after the fuel reformer housing container is sealed by the lid body, as outgas inside the fuel reformer housing container by influences of a temperature in reforming the fuel and as time passes, the gas can be favorably adsorbed by the gas adsorbent. It is therefore possible to maintain a vacuum state inside the fuel reformer housing container not only for a short period just after sealing the fuel reformer housing container 11 in which the fuel reformer 9 is housed, but also for a long period thereafter.

Further, according to the invention, the gas adsorbent is disposed between the fuel reformer and an inner surface of the concave portion or between the fuel reformer and the lid body so that the gas adsorbent is adjacent to or in contact with the fuel reformer. Consequently, the heat emitted from the fuel reformer can contribute to a rise in temperature of the gas adsorbent, thus activating the gas adsorbent, so that electric power for heating the gas adsorbent can be reduced and an efficiency of power generation of the fuel cell system can be enhanced.

Furthermore, the gas adsorbent can adsorb the heat which is conducted from the fuel reformer to the base and the lid body so that temperatures of a surface of lid body and a surface of base can be more effectively prevented from rising. It is thus possible to more effectively prevent the other components inside a mobile equipment from being broken so that the fuel cell system can be used stably and safely for a long period of time.

As a result, in a case where a fuel-reforming reaction is an endothermic reaction such as a steam-reforming reaction as expressed by the chemical reaction formula (1), there is no increase in an amount of outward conduction of heat generated in reforming the fuel inside the fuel reformer. Consequently, a temperature of the fuel reformer does not decrease, with the result that the need of increasing an amount of power generation of a heater is eliminated, resulting in no increase in power generation loss of the entire fuel cell system. By doing so, a high-efficient fuel cell system can be achieved.

Further, according to the invention, a distance between the gas adsorbent and the discharge pipe is set to be shorter than a distance between the gas adsorbent and the supply pipe. Consequently, the heat of the discharge pipe which has a high temperature attributable to reformed gas having a high temperature shortly after reformed by the fuel reformer, ca be utilized for activation of the gas adsorbent, with the result that the electric power for heating the gas adsorbent can be reduced, and moreover, a vacuum state inside the power generation loss fuel reformer housing container can be favorably maintained.

Further, according to the invention, the fuel reformer housing container further includes a lead terminal which is attached onto the base so as to be led from inside of the concave portion to outside, and the gas adsorbent is fixed on the lead terminal while securing a distance from the base. Consequently, the heat of the gas adsorbent can be effectively prevented from being conducted to the base, and the temperature of the gas adsorbent can be thus effectively prevented from decreasing so that the gas adsorbent can be maintained at a high temperature, with the result that electric power for heating the gas adsorbent can be reduced and the efficiency of power generation of the fuel cell system can be enhanced.

Further, according to the invention, the gas adsorbent is formed by depositing metal powder on a surface of a metal plate, and moreover, a lead terminal serving for energization of the gas adsorbent is provided so as to communicate the inside of the concave portion with outside thereof. On an energized portion of the metal plate is provided a high-resistance portion of which sectional area cut in a direction orthogonal to an energizing direction is smaller than sectional areas of other parts. Consequently, a locally high resistance is obtained on the high-resistance portion, and the high-resistance portion efficiently generates heat to thereby allow the metal powder deposited on its surface to be activated at a high efficiency, so that a value of current applied for activation of the gas adsorbent can be decreased. As a result, the electric power for heating the gas adsorbent can be reduced, and the efficiency of power generation of the fuel cell system using the fuel reformer housing container can be enhanced.

Further, the gas adsorbent can be activated efficiently by the high-resistance portion, and it is therefore possible to maintain a gas adsorbing function which is sufficient for maintaining the favorable vacuum state inside the fuel reformer housing container even with a smaller gas adsorbent. Accordingly, a space for housing the gas adsorbent can be reduced in size so that the fuel reformer housing container can be smaller in size and lower in height and furthermore, the fuel cell system equipment for mobile device using the fuel reformer housing container can be smaller in size and lower in height.

Further, according to the invention, the high-resistance portion is formed by providing a notch in the energized portion of the metal plate. Consequently, even in the case where the gas adsorbent is deformed due to influences of the heat generated in the activation through the energization effected by a lead terminal connected to the gas adsorbent, the notch can reduce the deformation and prevent stress from arising in the connection between the gas adsorbent and the lead terminal. As a result, it is possible to effectively prevent the connection between the lead terminal and the gas adsorbent from being damaged, and to effectively prevent the gas adsorbent from falling off from the lead terminal.

Further, according to the invention, the gas adsorbent is disposed so as to face the fuel reformer, and the notch is provided so as to face the fuel reformer. Consequently, the heat of the gas adsorbent can be radiated to the fuel reformer by moving the notch of the gas adsorbent, which generates a particularly large amount of heat, close to the fuel reformer, and can thus contribute to an increase in temperature of the fuel reformer so that the electric power being supplied for maintaining the high temperature of the fuel reformer can be reduced. As a result, the efficiency of power generation of the fuel cell system using the fuel reformer housing container can be further enhanced.

Further, according to the invention, a groove for discharging the gas inside the concave portion is formed on at least one of a joint of the base to the lid body and a joint of the lid body to the base. Consequently, it is possible to sufficiently discharge the gas existing in the fuel reformer housing container from the groove when the lid body and the base are joined to each other in a depressurized state, thus exhausting the air existing in the fuel reformer housing container so that a high vacuum can be formed inside the fuel reformer housing container. Moreover, even when the heat which is applied to the base or the lid body to join them to each other strains the base or the lid body, thus generating stress, a part defining the groove is appropriately deformed so that the stress can be absorbed, with the result that the defective sealing can be effectively prevented from arising.

Further, according to the invention, at least one of a joint of the base to the lid body and a joint of the lid body to the base is formed so as to protrude all around, and the groove is formed by notching a part of the protruded portion. Consequently, when the lid body and the base are joined to each other by the welding method with the heat generated only in the joint of the lid body to the base, it is possible to concentrate the heat on the projection, resulting in an increase in joint efficiency. At the same time, the heat can be effectively prevented from being transmitted to the base or the lid body so that the other components in the fuel reformer housing container or the other components disposed outside the fuel reformer housing container will not be impaired and so that the fuel reformer housing container will not be strained, resulting in no defective sealing.

According to the invention, the gas adsorbent is disposed along an inner surface defining the concave portion near the groove. Consequently, the groove is used for exhausting the air upon joining the base and the lid body to each other, and the gas adsorbent is brought close to the groove portion to which the air is liable to be deposited when the groove is being closed, thus allowing the air deposited on the groove portion to be efficiently adsorbed by the gas adsorbent promptly. That is to say, the efficiency of adsorbing the gas can be increased to a very high level by preventing a vicious circle such that the air deposited on the groove portion is released into the fuel reformer housing container and then deposited again on the other parts.

Further, according to the invention, the lid body and the base are made of a metal material of which thermal conductivity is 120 W/mK or less. Consequently, the heat emitted from the fuel reformer can be prevented from being conducted to the lid body and the base so that the temperatures of the surface of lid body and the surface of base can be more effectively prevented from rising. It is thus possible to more effectively prevent the other components inside the fuel reformer housing container and the other components outside the fuel reformer housing container from being impaired so that the fuel cell system can be used stably and safely for a long period of time.

Further, according to the invention, the above-described fuel reformer housing container of the invention and the fuel reformer housed in the concave portion are provided, thus achieving a fuel cell system which is stable, safe, and highly efficient for a long period of time.

Further, according to the invention, the gas adsorbent is provided on a surface of the fuel reformer, with the result that the gas adsorbent can be maintained at a high temperature by utilizing the heat of the fuel reformer also after the gas adsorbent has been activated by the heat of the fuel reformer. Consequently, in the case of using a highly-temperature-dependant gas adsorbent of which gas adsorption efficiency is high at a high temperature as compared to its use at a room temperature, the gas adsorbent can be used in a state where the gas adsorption efficiency is very high, with the result that the vacuum state inside the fuel reforming apparatus can be maintained not only for a short period just after sealing the fuel reforming apparatus in which the fuel reformer is housed, but also for a long period thereafter.

Further, according to the invention, the gas adsorbent and the fuel reformer are joined to each other via a metal plate. Consequently, a bonding strength between the gas adsorbent and the fuel reformer can be reinforced, and moreover, the heat released from the fuel reformer can be given to the metal plate, which heat can be used to activate the gas adsorbent evenly, so that the electric power for heating the gas adsorbent can be reduced and the efficiency of power generation of the fuel cell system can be enhanced.

Further, according to the invention, the gas adsorbent is disposed on a heat-generating portion of the fuel reformer. Consequently, the gas adsorbent can be heated directly by the heat-generating portion, with the result that the electric power required for heating the gas adsorbent can be further reduced, and moreover, the vacuum state inside the power generation loss fuel reforming apparatus can be maintained more favorably.

Further, according to the invention, an inner pressure of the concave portion is $10^2$ Pa or less. Consequently, the heat radiation from the fuel reformer can be prevented from causing the heat to be transmitted to the base and the lid body. Moreover, there is set a state where the level of vacuum around the gas adsorbent is increased so that the gas adsorbent deteriorates in activity, with the result that slight heat generated upon joining the base and the lid body can be effectively prevented from causing the gas adsorbent to be autoactivated so that the adsorbing property will not approach saturation.

Further, according to the invention, the lid body and the base are joined to each other by using any one of a projection method, a seam welding method, an electronic beam method, and a laser beam method. Consequently, only the joint between the base and the lid body and its neighbor area are heated, and it is thus possible to effectively prevent the heat from being transmitted from the joint between the base and the lid body to the gas adsorbent through the lid body so that the gas adsorbent will not be activated. This makes it possible to prevent the gas adsorbent from adsorbing the gas around the gas adsorbent upon attaching the lid body so that the adsorbing property will not approach the saturation and the deterioration of activity will not occur.

The invention claimed is:

1. A fuel reformer housing container comprising:
    a base having a concave portion for housing a fuel reformer in which gas containing hydrogen is generated from fuel;
    a discharge pipe operably allowing an inside of the concave portion to communicate with an outside thereof so as to discharge the gas from the fuel reformer;
    a supply pipe operably allowing the inside of the concave portion to communicate with the outside thereof so as to supply the fuel to the fuel reformer;
    a lid body joined to the base, the lid covering the concave portion of the base;
    a gas adsorbent housed in the concave portion, for adsorbing gas in the concave portion, and
    a lead terminal attached to the base, led from inside of the concave portion to outside thereof,
    wherein the gas adsorbent is on the lead terminal and apart from the base, inside the concave portion.

2. The fuel reformer housing container of claim 1, wherein the gas adsorbent is adjacent to or in contact with the fuel reformer, between the fuel reformer and an inner surface of the base or between the fuel reformer and the lid body.

3. The fuel reformer housing container of claim 1, wherein a distance between the gas adsorbent and the discharge pipe is shorter than a distance between the gas adsorbent and the supply pipe.

4. The fuel reformer housing container of claim 1, wherein the lead terminal is for energization of the gas adsorbent, and
    wherein the gas adsorbent is formed by depositing metal powder on a surface of a metal plate, the metal plate having a high-resistance portion in an energized portion thereof, the high-resistance portion having a sectional area smaller than sectional areas of the other parts of the metal plate in a direction orthogonal to an energizing direction of the energized portion.

5. The fuel reformer housing container of claim 4, wherein the high-resistance portion comprises a notch in the energized portion of the metal plate.

6. The fuel reformer housing container of claim 5, wherein the gas adsorbent is facing the fuel reformer, and the notch is facing the fuel reformer.

7. The fuel reformer housing container of claim 1, wherein a groove for discharging gas inside of the concave portion is on at least one of a joint of the base to the lid body and a joint of the lid body to the base.

8. The fuel reformer housing container of claim 7, wherein at least one of the joint of the base to the lid body and the joint of the lid body to the base protrudes outside of the concave portion all around the circumference, and the groove is formed by notching a part of the protruded portion.

9. The fuel reformer housing container of claim 7, wherein the gas adsorbent is disposed near the groove along an inner surface defining the concave portion.

10. The fuel reformer housing container of claim 1, wherein the lid body and the base are made of a metal material having a thermal conductivity of 120 W/mK or less.

11. A container for containing a fuel reformer in which gas containing hydrogen is generated from fuel comprising:
    a case having an enclosure in which the fuel reformer is arranged;
    a discharging passage operably connected to the case so as to discharge the gas from the fuel reformer;

a supplying passage operably connected to the case so as to supply the fuel to the fuel reformer; and a metallic adsorber arranged in the enclosure, for adsorbing a gaseous material in the enclosure, wherein the metallic adsorber is formed by depositing metal powder on a surface of a metal plate, the metal plate having a high-resistance portion in an energized portion thereof, the high-resistance portion having a sectional area smaller than sectional areas of the other parts of the metal plate in a direction orthogonal to an energizing direction of the energized portion.

12. A fuel reforming apparatus comprising:

a fuel reformer housing container of claim 1; and a fuel reformer housed in the concave portion.

* * * * *